United States Patent
Koch et al.

(10) Patent No.: US 11,533,845 B2
(45) Date of Patent: Dec. 27, 2022

(54) METHOD OF UNLOADING BATCH GRAIN QUANTITIES FOR HARVESTING MACHINES

(71) Applicant: AGCO Corporation, Duluth, GA (US)

(72) Inventors: Jared J Koch, Hesston, KS (US); Joshua Ekholm, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 346 days.

(21) Appl. No.: 16/723,649

(22) Filed: Dec. 20, 2019

(65) Prior Publication Data

US 2020/0196526 A1     Jun. 25, 2020

Related U.S. Application Data

(60) Provisional application No. 62/783,480, filed on Dec. 21, 2018.

(51) Int. Cl.
| | |
|---|---|
| *A01D 41/127* | (2006.01) |
| *H04W 4/40* | (2018.01) |
| *A01D 90/10* | (2006.01) |
| *B65G 67/24* | (2006.01) |
| *G05D 1/02* | (2020.01) |

(52) U.S. Cl.
CPC ......... *A01D 41/1275* (2013.01); *A01D 90/10* (2013.01); *B65G 67/24* (2013.01); *G05D 1/0287* (2013.01); *H04W 4/40* (2018.02); *B65G 2814/0302* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 6,216,071 B1 | 4/2001 | Motz | |
| 10,292,327 B2 | 5/2019 | Agco | |
| 2010/0287899 A1* | 11/2010 | Mackin | A01D 41/1217 56/10.2 R |
| 2011/0213531 A1* | 9/2011 | Farley | A01D 41/1275 701/50 |
| 2012/0215381 A1* | 8/2012 | Wang | G05D 1/0293 701/1 |
| 2016/0286724 A1* | 10/2016 | Duquesne | B60P 1/42 |
| 2018/0160624 A1 | 6/2018 | Agco | |

FOREIGN PATENT DOCUMENTS

WO     2017/205410 A1     11/2017

OTHER PUBLICATIONS

European Patent Office, Search Report prepared for Related EP Application No. EP 19 20 5111, dated May 4, 2020.

* cited by examiner

*Primary Examiner* — Adam D Tissot
*Assistant Examiner* — Garrett F Evans

(57) ABSTRACT

An apparatus is presented that receives first and second parameters including first parameters from plural harvesting machines, determines a batch unload for a specified quantity of material to unload from each of the harvesting machines, requests permission to receive the batch unload from one of the harvesting machines, and communicates a control signal to trigger the requested batch unload from the one of the harvesting machines.

14 Claims, 9 Drawing Sheets

METHOD OF UNLOADING BATCH GRAIN QUANTITIES FOR HARVESTING MACHINES

CROSS REFERENCE TO RELATED APPLICATION

This application claims the benefit of U.S. Provisional Application No. 62/783,480 filed Dec. 21, 2018, which is hereby incorporated by reference in its entirety.

TECHNICAL FIELD

The present disclosure is generally related to farming operations, and, more particularly, computer-assisted logistics in farming.

BACKGROUND

During field harvests, a system of harvesting machines and one or more grain carts cooperate in a logistical operation to harvest crop and transport the crop to semi-truck trailers, which in turn transport the harvested crop to a processing/storage facility (e.g., grain elevator). In general, decisions as to unloading quantities and selection among harvesting machines to receive batch loads are dictated by each harvesting machine operator. In one example operation, as a harvesting machine (e.g., combine harvester or combine) advances along a field harvesting crop, a grain collection vehicle (e.g., grain cart) pulls up alongside the combine. The combine operator activates a swing-away operation for an unloader tube to place the unloader tube in an operational position (e.g., unloading position). Once at that position, the operator then activates a batch unloading operation, where the harvested material is unloaded from a storage bin of the combine, the path of crop material flow achieved through the unloader tube via a discharge auger, and into a storage bin of the grain cart. Upon completion of the batch unload operation, the grain cart advances to the next combine in the field, ideally with a goal of performing these operations while the combine and grain cart are in motion.

Since each operator wishes to continue moving and harvesting crop, there is some bias in batch unloading. For instance, one operator may cause a complete batch unload from his combine in an effort to ensure that he maximizes the time his header is in operation and harvesting crop. As the grain cart advances to other combines in the field, this desire among the prior operator and/or other operators to unload large batches may occur at the expense of others, resulting in an inefficient operation where one or more combines are frequently unable to discharge batches and have to sit idle while the grain cart unloads (e.g., to a semi-truck trailer) and returns.

SUMMARY OF THE INVENTION

One object of the present invention is to provide an apparatus that reduces idle time in material harvesting operations that require repeated unloading of material among harvesting machines to continue operations. To better address such concerns, in a first aspect of the invention, an apparatus is disclosed that receives first and second parameters including first parameters from plural harvesting machines, determines a batch unload for a specified quantity of material to unload from each of the harvesting machines, requests permission to receive the batch unload from one of the harvesting machines, and communicates a control signal to trigger the requested batch unload from the one of the harvesting machines. Through this monitoring of harvesting machine operational parameters and strategic customization of batch quantities to unload according to a selective order, efficiency in material collection and unloading may be improved.

In one embodiment, the first and second plural parameters include any one or a combination of a current total load amount residing in each of the harvesting machines, load capacity remaining in each of the harvesting machines, a time component corresponding to a time for the respective load to reach the respective load capacity of each of the harvesting machines, a heading of a collection vehicle and each of the harvesting machines, a current load in the collection vehicle, a length of a field run for each of the harvesting machines, protein content of the material, or water content of the material, wherein one or more processors are further configured by the instructions to receive updates to the first and second plural parameters on a repeated basis. The judicious collection of the plural parameters enables determinations of batch unloads that maximize the efficiency of harvesting operations and forms a basis for a more objective approach to batch unloads for harvesting operations.

In one embodiment, prior to the permission request, the one or more processors are further configured by the instructions to determine an order from among all of the harvesting machines from which the material collection vehicle is to receive batch unloads and in what quantity based on the first and second plural parameters. The determination of customized batch quantities and the order of collection enable the strategy of optimizing harvesting operations by keeping as many harvesting machines in operation as possible.

In one embodiment, the one or more processors are further configured by the instructions to determine the order and the batch quantities by repeatedly determining a distance of the collection vehicle relative to each of the harvesting machines, an extent to which a maximum amount of the harvesting machines and the collection vehicle can remain in motion during a batch unload from one of the harvesting machines, a time component corresponding to a length of time required by the collection vehicle to unload and return for additional batch unloads, and a length of time for the collection vehicle to reach each of the harvesting machines. The evaluation of motion of the harvesting machines in relation to the motion of the collection vehicle is performed in conjunction with the batch unload determinations enables a prediction of loads as the collection vehicle progresses from one harvesting machine to another to reduce idle time amongst the harvesting machines.

In one embodiment, the one or more processors are further configured by the instructions to request permission by including a request for an operator of the one of the harvesting machines to position an unloader tube into an operational position. These features enable remote control of harvesting unloading operations to improve the efficiency of batch unloading.

In one embodiment, the one or more processors are further configured by the instructions to communicate, via the communications interface, the control signal based at least in part on an indication corresponding to the unloader tube being in the operational position. By automatically initiating the batch unload, delays based on operator distraction are avoided, further enhancing the efficiency of batch unloading operations.

These and other aspects of the invention will be apparent from and elucidated with reference to the embodiment(s) described hereinafter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Figure 1:
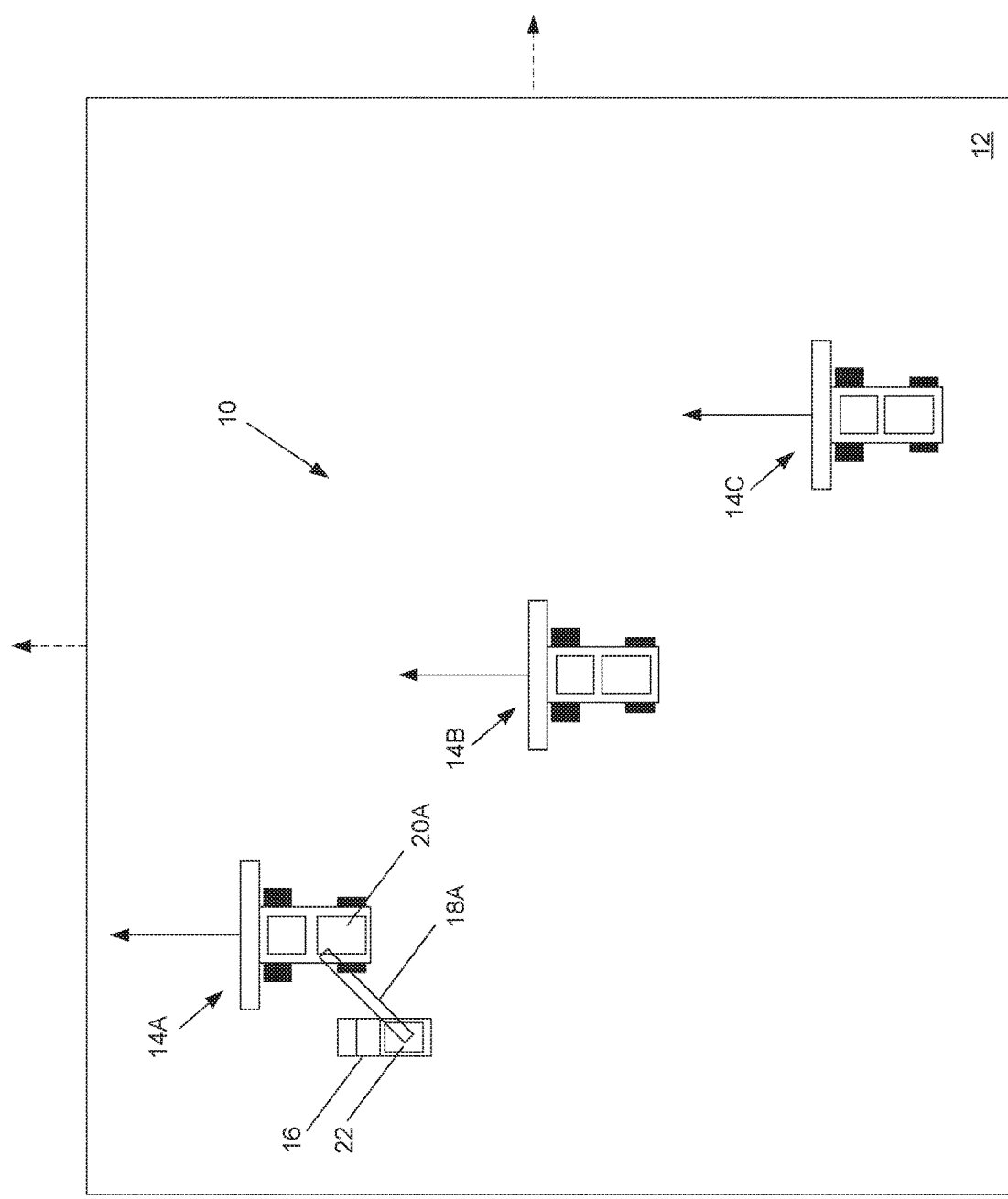
FIGS. 1-3 are schematic diagrams that illustrate an embodiment of an example harvest batch unloading system operating in a field.

Certain embodiments of harvest batch unloading systems and methods are disclosed that are used to increase the efficiency of the overall farming, hauling, and harvesting operations of a farming operation. In one embodiment, a harvest batch unloading system includes plural harvesting machines (e.g., combine harvesters), a collection vehicle (e.g., grain cart), and an apparatus that is used, in one embodiment, in association with the collection vehicle to communicate with the harvesting machines and intelligently manage batch unloads from the harvesting machines to the collection vehicle. For instance, certain embodiments of a harvest batch unloading system enable the collection vehicle to be filled to a maximum legal limit while enabling the harvesting machines to operate at a maximum harvesting capacity. One strategy to maximize harvesting capacity is to limit a total amount of time each harvesting machine spends in an idle or non-harvesting state. In a multiple harvesting machine system, one strategy is to have a lead harvesting machine harvesting material (crop material, such as grain) while follower/trailing harvesting machines (also continuing harvesting operations) maintain an ideal spacing to limit travel time for the collection vehicle between unloads or dumps (e.g., to a semi-truck trailer located proximal to the field being harvested or other unloading vehicle or facility). Such a strategy results in each of the harvesting machines unloading different batch unloads (e.g., different amounts of grain) based on a current remaining storage bin capacity of the harvesting machine, current yield, and future time-to-fill, among other parameters. In one embodiment, the apparatus, embodied as a processor-based, communications device and in one embodiment, residing with an operator of the collection vehicle, makes use of plural parameters from the harvesting machines and the collection vehicle to coordinate the batch unloads in an efficient manner. Notably, as the industry designs larger unloader tubes, there is a significant amount of grain stored within the unloader tube, and that fact needs to be considered in batch unloading strategies. Accordingly, the apparatus receives, among other information/parameters, information/parameters corresponding to unloaded grain amounts at each harvesting machine, flow characteristics (e.g., unload rate, bin filling rate, etc.), lead time (e.g., time it takes grain to reach an unloading auger of an unloader tube), unload full volume delay (e.g., time it takes for the unloader tube to reach full volume), and lag time (e.g., time it takes for an unloader tube to empty or stop grain conveyance).

Digressing briefly, and as noted in the background, batch unload strategies are often biased since they rely on each operator's desire to maximize the harvesting efficiency of his own machine. With certain embodiments of a harvest batch unloading system, the batch unload strategies are performed according to an objective, holistic approach that maximizes the harvesting and hauling efficiencies of the system of harvesting machines and collection vehicle(s) as a whole.

Having summarized certain features of a harvest batch unloading system of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on a harvesting machine embodied as a combine harvester, a collection vehicle embodied as a grain cart, and an apparatus embodied as a smartphone device, all collectively used in a farming operation. However, it should be appreciated that, in some embodiments, one or more of the components may be replaced with other components in the same or different industries. For instance, the apparatus may be embodied as a laptop, notebook, or other computing device with communications capabilities, or in some embodiments, the apparatus may be embodied as a computing system integrated in the collection vehicle, utilizing gateway communication devices and one or more controllers that provide control of operations for other systems in the collection device. As another example, apparatus may be located off-field (external to the collection vehicle), such as in a farming office, where the coordination is performed remotely based on sensors located in the respective machines and vehicle that communicate the data to the apparatus at the farming office. In some embodiments, the apparatus may reside with an operator of one of the harvesting machine (or integrated therein). As yet another example of the contemplated scope of the disclosure, though grain collection in a field harvesting operation is one focus of the disclosure, certain embodiments may harvest other crop using other types of harvesting machines, and in some embodiments, the material may be non-crop material from other industries. In other words, the logistics involved with the pick-up and collection and transport of other materials in the same or other industries may benefit from the inventive systems and methods described herein, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the harvesting machine looking forwardly.

Figure 2:
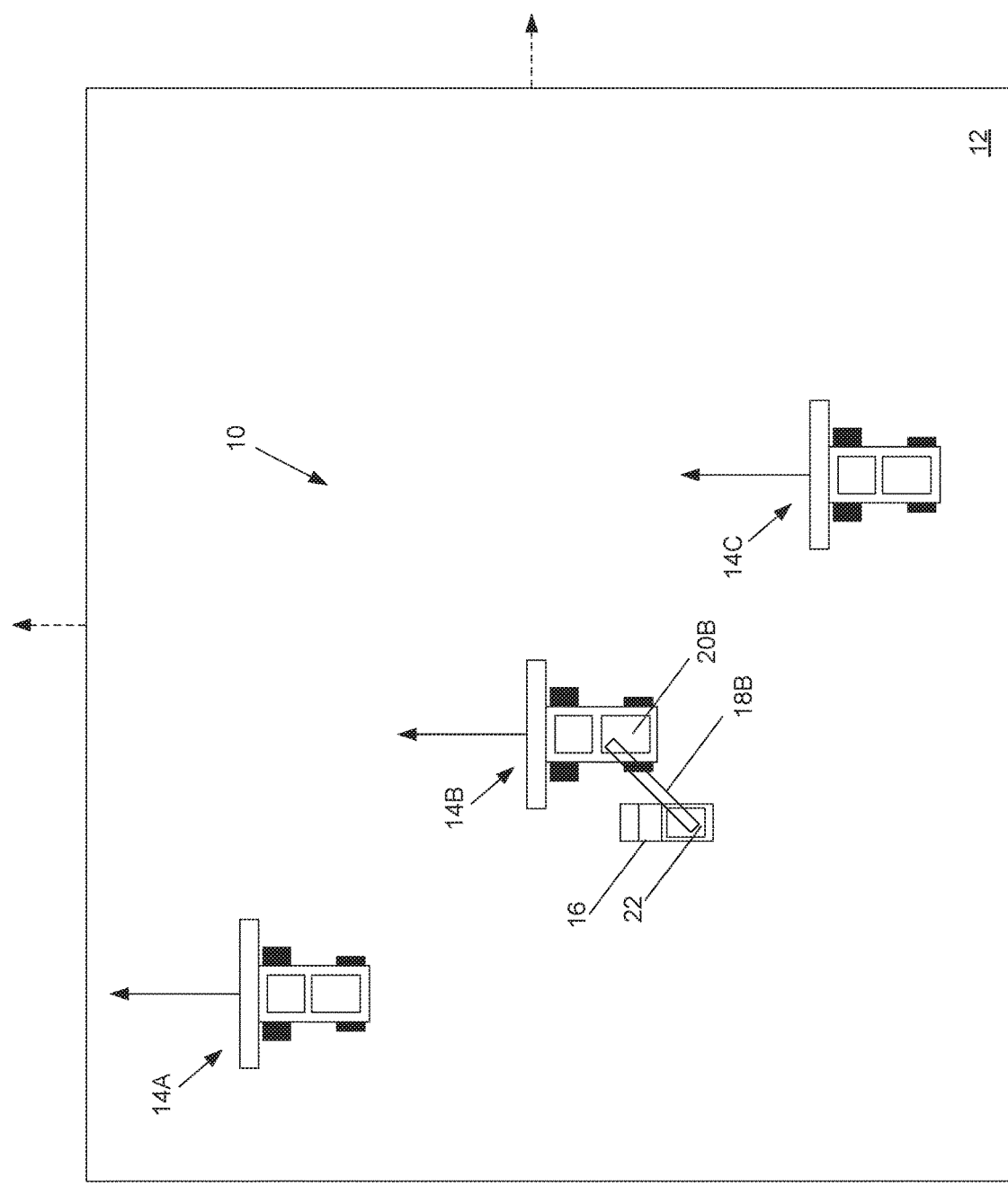
Figure 3:
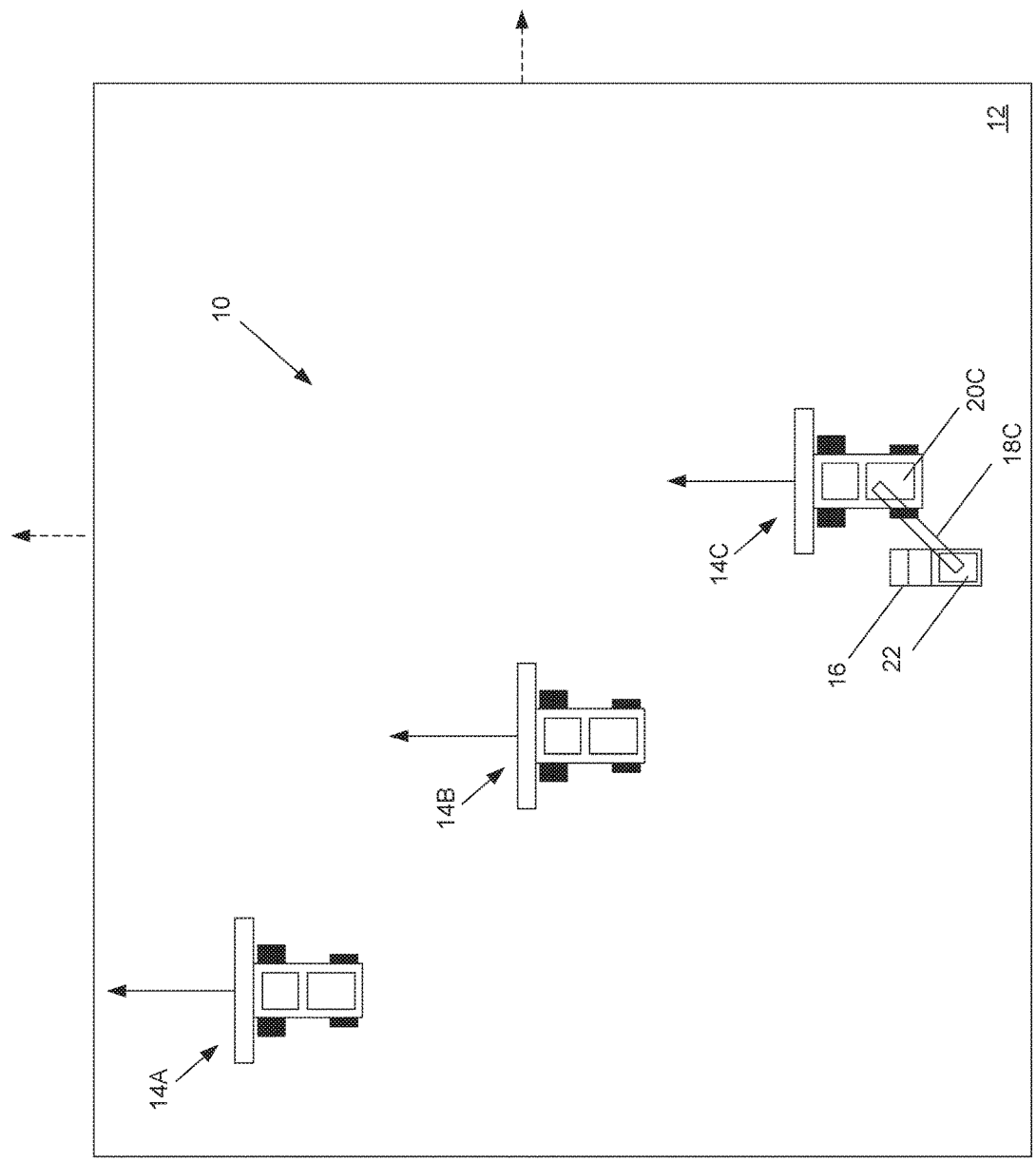

Referring now to FIGS. 1-3, shown is an embodiment of an example harvest batch unloading system 10 operating in a field 12. The harvest batch unloading system 10 comprises plural harvesting machines 14 (e.g., 14A, 14B, and 14C), a collection vehicle 16, and an apparatus (not shown) that, in one embodiment, resides in the collection vehicle 16. The harvesting machines 14 are traversing the field 12, with the follower harvesting machines 14B and 14C trailing the lead harvesting machine 14A in a manner that ensures the collection vehicle 16 can efficiently receives batch unloads while limiting traversals to each harvesting machine 14. In FIG. 1, the collection vehicle 16 is pulled up alongside the harvesting machine 14A, and while in motion, receives a batch unload from the harvesting machine 14A as determined by the apparatus. As shown schematically in FIG. 1, an unloader tube 18A is in an operational position to enable flow of harvested grain into the unloader tube 18A as influenced by the unloader auger (not shown, but located within the unloader tube 18A) from a storage bin 20A of the harvesting machine 14A to a storage bin 22 of the collection vehicle 16 (e.g., the batch unload). In advance of the batch unload from the harvesting machine 14A, the apparatus determines (e.g., on a repeated basis, such as continuously) the order in which the collection vehicle 16 should approach each harvesting machine 14 (e.g., in this example of FIGS. 1-3, first the lead harvesting machine 14A, followed in order by the follower harvesting machine 14B, followed in turn by the harvesting machine 14C) for the respective batch unload, and the quantity of each batch unload, based on receiving plural parameters from the harvesting machines 14 and the collection vehicle 16 and determining, based on computation of basic physics (e.g., kinematics equations) and flow dynamics, where each harvesting machine 14 will be located along the field and at what bin load when the collection vehicle 16 reaches the respective harvesting machine 14 after receiving a batch unload from a prior harvesting machine 14 or after unloading the contents of the storage bin 22 at a semi-truck trailer (or other receptacle) and returning to the field 12 for more batch unloads. Thus, the batch unload from the harvesting machine 14A may be different than the batch unload from the harvesting machines 14B and/or 14C in an effort to facilitate the continued motion (and hence harvesting) by all of the harvesting machines 14 while the collection vehicle 16 performs its collection and unloading functions. The parameters received by the apparatus are described further below.

Referring to FIG. 2, with an identification of system components as described similarly in FIG. 1, the collection device 16 has already received the batch unload from the harvesting machine 14A (as described in association with FIG. 1), and has moved on to harvesting machine 14B according to the order determined in advance by the apparatus based on plural parameters received from the harvesting machines 14 and the collection vehicle 16. The collection vehicle 16 may have, prior to approaching the harvesting machine 14B, diverted to a semi-truck trailer for unloading, or the encounter with the harvesting machine 14B may be immediately subsequent to receiving the batch unload from the harvesting machine 14A, depending on the strategy determined by the apparatus. Note that the apparatus receives updates of the plural parameters on a repeated basis (e.g., continuously, such as every minute, or at another frequency that is regular or in some embodiments, irregular based on certain triggering conditions). As shown in FIG. 2, the unloader tube 18B of the harvesting machine 14B is in an operational position, and the collection vehicle 16 is positioned with its storage bin 22 underneath the outlet of the unloader tube 18B, the storage bin 22 receiving (while in motion) a batch unload from the storage bin 20B of the harvesting machine 14B according to the predetermined quantity determined by the apparatus to enable an efficient harvesting operation for the system 10 overall. The amount of the batch unload may be less for the harvesting machine 14B than for the harvesting machine 14A, the same, or more, depending on the plural parameters and distances and times to and from each of the machines 14 and/or the semi-truck trailer, as well as based on fill and unloading rates. After receiving the batch unload from the harvesting machine 14B, the collection vehicle 16 may travel to the semi-truck to unload the storage bin 22 or directly advance from the harvesting machine 14B to the harvesting machine 14C, depending on the strategy determined by the apparatus.

In FIG. 3, the collection vehicle 16 is moving alongside the harvesting machine 14C, which has the unloader tube 18C swung out in an operational position. As in FIGS. 1-2, the storage bin 22 of the collection vehicle 16 receives the predetermined batch unload from the storage bin 20C of the harvesting machine 14C via the unloader tube 18C while the collection vehicle 16 and the harvesting machines 14 (similar to the circumstances of FIGS. 1A-1B) are all moving.

In the harvest batch unloading system 10 depicted in FIGS. 1-3, the harvesting machines 14 continue to move (to the extent possible according to the deployed strategy) and harvest the field 12 while the collection vehicle 16 makes its rounds among the harvesting machines 14, collecting the batch unloads according to a predetermined strategy or plan by the apparatus that is repeatedly updated based on the receipt of plural parameters. It should be appreciated by one having ordinary skill in the art, in the context of the present disclosure, that the harvest batch unloading system 10 depicted in FIGS. 1-3 is one illustrative example, and that in some embodiments, the system 10 may include a different quantity of harvesting machines 14 and/or collection vehicles 16 traversing the field 12 in a different manner.

Figure 4:
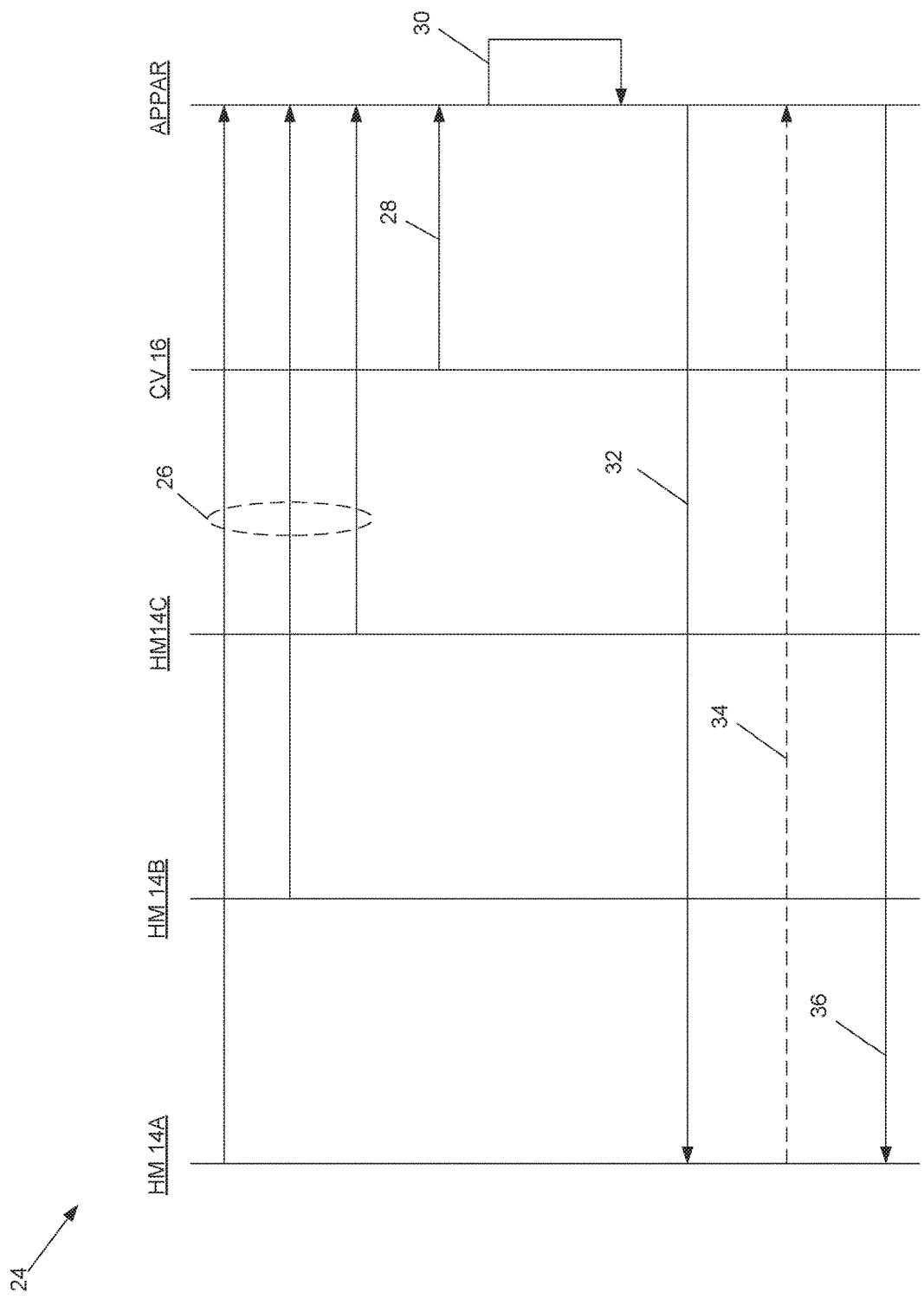
FIG. 4 is a schematic diagram that illustrates example communications and data exchanges during operations for an embodiment of an example harvest batch unloading system.

Having described an example operation of the harvest batch unloading system 10, attention is directed to FIG. 4, which illustrates a timing diagram 24 for example communications and data exchanges during operations for the harvest batch unloading system 10. It should be appreciated by one having ordinary skill in the art, in the context of the present disclosure, that the timing diagram 24 is one illustrative example of communications and/or data exchanges, and that in some embodiments, a different timing of communications and/or different types of data exchanges and/or data may be implemented in some embodiments. Along the top of the diagram 24 are acronyms for the components shown in, or described in association with, FIGS. 1-3, including the harvesting machine 14A (HM 14A), harvesting machine 14B (HM 14B), harvesting machine 14C (HM 14C), collection vehicle 16 (CV 16) and an apparatus (appar). The horizontal, arrowed lines indicate the direction of the communication and data exchange. It is assumed that the harvesting machines 14 and collection vehicle 16 are operating in a field, similar to the operations depicted in FIGS. 1-3, with the apparatus residing with the collection vehicle operator, though not limited to that location. With continued reference to FIGS. 1-3, and referring to FG. 4, in step (26), the harvesting machines 14A, 14B, and 14C communicate plural parameters (e.g., first parameters) to the apparatus. For instance, a communications interface in each harvesting machine 14 may repeatedly (e.g., continually, periodically, or aperiodically) communicate parameters corresponding to loads in their respective storage bins 20, rate of change of those loads, and capacity, as well as other parameters including heading and locations (e.g., geospatial coordinates). These communications may be established based on operators of each harvesting machine 14 and the collection vehicle 16 establishing a cellular connection manually, or automatically upon entering a given field (e.g., based on geospatial data indicating entry onto the field (e.g., within a geofence), or based on operator input indicating the field location). In some embodiments, a radio frequency, wireless connection may be established, wherein each communications interface of the respective harvesting vehicle 14 and collection vehicle 16 establishes a connection to a wireless local area network created among the harvesting machines 14 and collection vehicle 16. Similarly to the cellular connection, the radio frequency wireless connections may be established automatically (e.g., upon detected entrance onto the field or input designating the location), or upon manual activation by each operator.

In step (28), the collection vehicle 16 communicates additional parameters (e.g., second parameters) to the apparatus. Such communications may be via a wireless, short range communication protocol, including Bluetooth, Zigbee, infrared, near field communication (NFC), or other wireless mechanisms (e.g., Wi-Fi) or wired mechanisms (e.g., connecting the apparatus to a port in the collection vehicle 16, such as a USB port). In some embodiments where functionality of the apparatus is integrated into a computing system that is integrated into the collection vehicle 16, communications may be achieved via signals across a controller area network (CAN) bus, via a wireless communication protocol, or a combination of wired and wireless communications. The additional parameters may include the capacity of the storage bin 22 of the collection vehicle 16, the current load, as well as the heading and location (e.g., geospatial location) of the collection vehicle 16.

In general, the first and second plural parameters received by the apparatus from the harvesting machines 14 and the collection vehicle 16 include any one or a combination of a current total load amount residing in each of the harvesting machines 14, load capacity remaining in each of the harvesting machines 14, a time component corresponding to a time for the load to reach the load capacity of each of the harvesting machines 14, a heading of a collection vehicle and each of the harvesting machines 14, a current load (and capacity, and remaining capacity) in the collection vehicle 16, a length of a field run for each of the harvesting machines 14, protein content of the harvested material, or water content of the harvested material. The apparatus receives updates to the first and second plural parameters on a repeated basis.

Step (30) includes the apparatus determining an order by which the collection vehicle 16 is to collect batch unloads from the harvesting machines 14 and the amount of each batch unload based on the first and second plural parameters. Step (30) may be prompted by an operator of the collection vehicle (or other, non-harvesting machine personnel) requesting (manually) batch unloads or as determined (automatically) by logic (e.g., software) in the apparatus. The apparatus uses a strategy that maximizes the harvesting efficiency of the harvesting machines 14, namely, ensuring that each of the harvesting machines 14 is always moving (and hence harvesting) throughout the batch unload process. In one embodiment, the apparatus determines specific batch quantities from each of the harvesting machines 14 based on the first and second plural parameters involving grain flow and unloading parameters (e.g., independent of order, or based on proximity of the collection vehicle 16 to the harvesting machines 14). The apparatus then uses the parameters that indicate heading and location among the harvesting machines 14 and the collection vehicle 16 to determine an order of harvesting machine encounters based on the determined batch unloads. Additional parameters may include a location of the semi-truck trailer that the collection vehicle 16 unloads the grain to from the storage bin 22 when the load capacity has been reached, and the time the collection vehicle 16, traveling at a predetermined velocity, makes the trip and returns to receive more batch unloads. More specifically, the apparatus determines the batch quantities based on capacities and grain volumes and flows and the order of unloading by repeatedly determining a distance of the collection vehicle 16 (e.g., in one embodiment, associated with the apparatus) relative to each of the harvesting machines 14, an extent to which a maximum amount of each of the harvesting machines 14 and the collection vehicle 16 can remain in motion during a batch unload from one of the harvesting machines 14, a time component corresponding to a length of time required by the collection vehicle 16 to unload and return for additional batch unloads, and a length of time for the collection vehicle 16 to reach each of the harvesting machines 14. Such determinations involve basic physics (e.g., kinematics equations and flow rate equations), yet also incorporate additional determinations based on the plural parameters. That is, the apparatus is combining the kinematic determinations involving time, velocity, and distance pertaining to the current and expected motion and/or anticipated locations in the field 12 of all of the harvesting machines 14 and the collection vehicle 16 as well as the change in loads (e.g., fluid or more specifically, bulk material flow rates) throughout this process according to fluid/bulk flow characteristics of the material handling capabilities and actual performance by the harvesting machines 14 and the collection vehicle 16. For instance, the parameters received by the apparatus for batch unloads may include the time it takes for grain to reach the unloader auger of the unloader tube 18, the time it takes for the unloader tube 18 to reach full load capacity, and the time it takes for the unloader tube 18 to empty or stop the conveyance of grain. Further, the parameters provided to the apparatus inform the apparatus of how much grain is in each of the storage bins 20 of the harvesting machines 14, the capacity of each of the storage bins 20, the rate of grain unloading from each harvesting machine 14, how much time remains until each of the storage bins 20 are full to determine batch unloads, and the ordering may be based on the locations and headings of the harvesting machines 14 and the collection vehicle 16 (e.g., including kinematic data and view of the aforementioned flow characteristics), including where in the field those storage bins are expected to be full. Note that these determinations of batch unloads and order of batch unloads may be performed in some embodiments in parallel, or in a different order (e.g., heading, locations, etc. before batch unload determinations) in some embodiments, or in some embodiments, in a manner that toggles the determination ordering.

Also included among the parameters is the capacity of the storage bin 22 of the collection vehicle 16, the current load level, and the time it takes for the collection vehicle 16 to unload the grain from the storage bin 22 of the collection vehicle (e.g., the rate of unloading to the semi-truck trailer). These determinations by the apparatus are updated, for instance, after each batch unload or even more frequently to determine whether the strategy instituted at any given time is still valid over an anticipated round of batch unloads and unloads to the semi-truck trailer. Further, the apparatus repeatedly makes these determinations (e.g., for batch quantities and ordering) to ensure or help achieve the strategy of keeping the harvesting machines 14 in operation during the process. For instance, considerations include how the duration of a given batch unload at one of the harvesting machines 14 affects the proximity to load capacity of the other harvesting machines 14 with further considerations of the travel distance and time needed by the collection vehicle 16 to receive other batch unloads and/or unload and return.

In step (32), the apparatus, upon establishing a strategy, including batch unload quantities and an order of harvesting machine encounters, communicates a request for permission (permission request) to the first harvesting machine 14 in the order (e.g., harvesting machine 14A in FIG. 1) as established in step (30). The permission request is a request to receive a batch unload from the harvesting machine 14A of the determined batch unload quantity. In one embodiment, the permission request may include an instruction/request presented on a user interface in the harvesting machine 14A (or on an associated device, such as a smartphone, laptop, speaker, etc.) for the operator to activate the unloader tube 18 to swing the tube 18 into an operational position, or in some embodiments, may trigger the deployment of the unloader tube 18 with a warning presented via the user interface to the operator of that harvesting machine 14A that the deployment of the unloader tube 18 (e.g., swing open and in operational position) begins in a specified amount of time (e.g., to which the operator of the harvesting machine 14A can acknowledge or deny and hence prevent). In some embodiments, the unloader tube 18 may already be deployed in an operational position (e.g., before or after the permission request), which may be indicated via signaling from the harvesting machine 14A (e.g., based on user input or from a sensor, communicated via the communications interface of the harvesting machine 14A).

In optional step (34) (optional as denoted by the dashed line), the harvesting machine 14A communicates a signal to the apparatus when the unloader tube 18 is in an operational position and the harvesting machine 14A is ready to provide a batch unload. The signal may be communicated based on selection by the operator of the harvesting machine 14A of a user interface (e.g., on-screen button icon, physical switch, button, lever, microphone, etc.), which triggers the signal to be communicated to the apparatus. In some embodiments, a position sensor (e.g., on the unloader tube 18) may detect the operational position, triggering a communications interface on the harvesting machine 14A to signal to the collection vehicle 16 that the unloader tube 18 is in the operational position.

Figure 5:
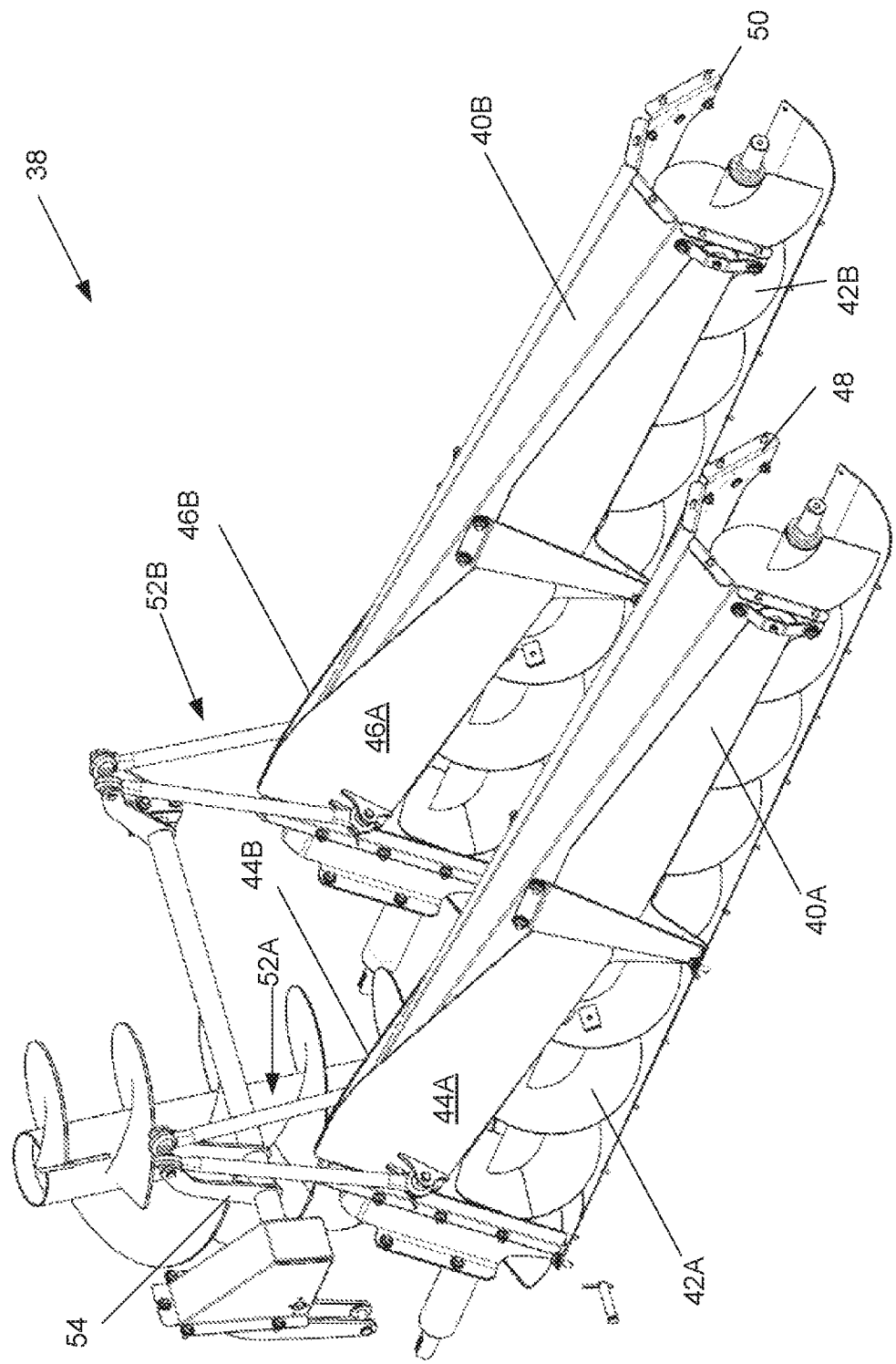
FIG. 5 is a schematic diagram that illustrates an embodiment of flow control gates used to control a batch unload from a harvesting machine.

Step (36) involves the apparatus communicating a (control) signal to the harvesting machine 14A to activate or trigger the activation of the flow control mechanisms of the storage bin 20A of the harvesting machine 14A. In one embodiment, the flow control mechanisms may be one or more flow control gates (or simply hereinafter, gates) that regulate the release of the grain from the storage bin 20A to the unloader tube 18A and through the outlet of the unloader tube 18A and to the storage bin 22 of the collection vehicle 16. FIG. 5 is one example of a gate adjustment structure 38 that is used to control the release and flow of crop material (e.g., grain) from the storage bin 20 of the harvesting machine 14. The gate adjustment structure 38 resides in the storage bin 22 of each of the harvesting machines 14 and includes auger covers 40 (40A, 40B) that are adjustably positioned over augers 42 (42A, 42B) to regulate the flow of crop material in the direction of the unloader tube 18. The crop material movement is influenced by activation of the augers 42, which draws the crop material in the direction of the unloader tube inlet. The auger covers 40 are shown in FIG. 5 in a raised position over the augers 42 in a skewed manner, such that the space between the auger covers 40 and respective augers 42 is greater at the discharge side of the augers 42 than the space between the interior end of the augers covers 40 and the respective augers 42. The auger covers 40 may be adjustably raised and lowered. The auger covers 40 comprise multiple segments, including respective gates 44A, 44B and 46A, 46B (the gates 44B, 46B only partially shown but of the same structure as that of the opposing half 44A, 46A) and hats 48, 50. The movement of the gates 44, 46 is according to a link assembly 52 (52A, 52B) that is pivotably coupled to the gates 44, 46, which opens and closes (or widens and narrows) a somewhat tapered gap between the gates 44, 46 and the lower surface beneath the augers 42. The adjustments (e.g., opening and closing) of the gates 44, 46 via the link assembly 52 may be achieved in incremental openings of the gates (e.g., 0%, 5%, 10%, etc.) or in some embodiments, more continual or progressive transitions in the openings or gaps. The link assembly 52 in turn is actuated via a crank and shaft assembly 54, where rotation of the shaft results in rotation of the cranks, which in turn causes the raising and lowering of the link assembly 52. Actuation of the assembly for raising and lowering the gates 44, 46 may be via a control system comprising a hydraulic cylinder(s) in cooperation with a control valve integrated, or associated, with an actuator, or via cylinders of other motive sources and/or actuable devices (e.g., electric motors/actuators, mechanical, pneumatic, etc.). Further information on the gate adjustment structure 38 and mechanisms of control may be found in commonly assigned, U.S. Patent Publication No. 2018/0160624, incorporated herein by reference in its entirety.

Figure 6A:
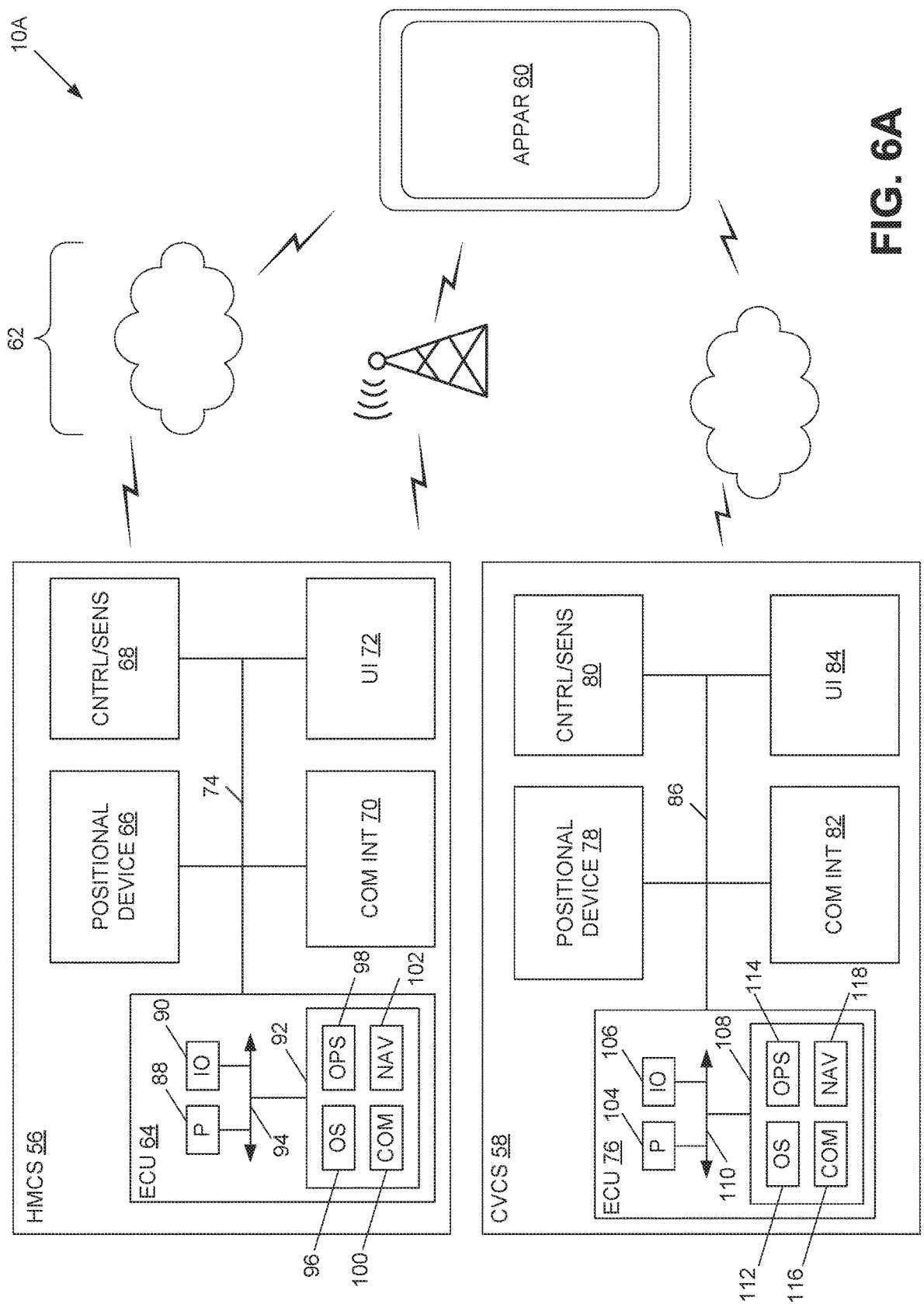
FIG. 6A is a schematic diagram that illustrates an embodiment of an example harvest batch unloading system.

Attention is now directed to FIG. 6A, which illustrates an embodiment of an example harvest batch unloading system 10A. It should be appreciated by one having ordinary skill in the art, in the context of the present disclosure, that some embodiments may include additional components or fewer or different components, and that the example depicted in FIG. 6A is merely illustrative of one embodiment among others. In one embodiment, the harvest batch unloading system 10A comprises a harvesting machine control system (HMCS) 56, a collection vehicle control system (CVCS) 58, and a control apparatus (APPAR) 60 communicatively coupled to the machine control system 56 and the collection vehicle control system 58 via a wireless/cellular network 62. Though depicted in this example as control systems for a single harvesting machine and a single collection vehicle, it should be appreciated by one having ordinary skill in the art, in the context of the present disclosure, that certain embodiments of a harvest batch unloading system 10A may include additional control systems of a similar structure for additional machines and/or vehicles. The harvesting machine control system (HMCS) 56 comprises a controller or electronic control unit (ECU) 64, a positional device 66, controlled devices and sensors (CNTRL/SENS) 68, a communications interface (COM INT) 70, and a user interface (UI)) 72, all coupled over one or more networks or busses, including a controller area network (CAN) bus 74. The collection vehicle control system 58 comprises a controller or electronic control unit (ECU) 76, a positional device 78, controlled devices and sensors (CNTRL/SENS) 80, a communications interface (COM INT) 82, and a user interface (UI)) 84, all coupled over one or more networks or busses, including a controller area network (CAN) bus 86. The apparatus 60 is described further below in association with FIG. 6B. Note that the use of a single controller 64 or 76 is for ease of illustration, and that additional controllers may be used in some embodiments.

Referring to the harvesting machine control system (HMCS) 56, the controller 64 comprises one or more processors (P) 88, an input/output (IO) interface 90, and memory (M) 92 coupled to one or more busses 94. The controller 64 is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 64. The processor 88 may be embodied as a custom-made or commercially available processor, a central processing unit (CPU) or an auxiliary processor among several processors, a semi-conductor based microprocessor (in the form of a micro-chip), a macroprocessor, one or more application specific integrated circuits (ASICs), a plurality of suitably configured digital logic gates, and/or other known electrical configurations comprising discrete elements both individually and in various combinations to coordinate the overall operation of the controller 64.

The input/output interface 90 provides one or more interfaces to the bus 74. In other words, the IO interface 90 may comprise any number of interfaces for the input and output of signals (e.g., analog or digital data) for conveyance over the bus 74. The input may comprise input by an operator (local or remote) through the user interface 72 and/or input from signals carrying information from one or more of the components of the harvesting machine control system 56, such as inputs from the positional device 66, the controlled devices and sensors 68, and/or the communications interface 70. The output may comprise signals from the processor 88 executing the software in memory 92.

The memory 92 may include any one or a combination of volatile memory elements (e.g., random-access memory (RAM), including DRAM, SRAM, SDRAM, etc.) and non-volatile memory elements (e.g., ROM, Flash, solid state, EPROM, EEPROM, etc.). The memory 92 may store a native operating system, one or more native applications, emulation systems, or emulated applications for any of a variety of operating systems and/or emulated hardware platforms, emulated operating systems, etc. The memory 92 comprises executable code or instructions that are executed by the processor 88 to carry out the functionality of the controller 64. In the depicted embodiment, the memory 92 comprises an operating system (OS) 96, operational software (OPS) 98, communications software (COM) 100, and navigational software (NAV) 102. In some embodiments, the memory 92 may comprise additional information, including field maps, device identifiers of devices acquired by the communications software 100 (e.g., MAC address, service set identifier (SSID), cellular numbers, IP addresses, etc.), and repeatedly updated information on processes monitored by the operational software 98 and navigational software 102 and/or preset capacities/specifications of the harvesting machine 14, including bin storage capacity, current load, fill and discharge rates, location, speed, heading, unloader tube capacity, unloader tube current material volume, timing and/or delays in bin storage operations (e.g., delay in release of crop material into the unloader tube 18 from the storage bin 20, etc.). One or more of the aforementioned information/parameters may be communicated to other authorized devices and/or accessed by such devices. It should be appreciated that in some embodiments, additional or fewer software modules (e.g., combined functionality) may be employed in the memory 92 or additional memory. In some embodiments, a separate storage device may be coupled to the data bus 94 or bus 74, such as a persistent memory (e.g., optical, magnetic, and/or semiconductor memory and associated drives). In some embodiments, functionality of the controller 64 may be distributed among plural controllers.

The operational software 98 monitors and controls various functionality corresponding to the harvesting, storage, and unloading functions of the harvesting machine 14. The operational software 98 receives input via the input/output interface 90, including user input from the user interface 72 and sensor input from the controlled devices and sensors 68, and delivers outputs via the input/output interface 90 to the controlled devices and sensors 68. For instance, the operational software 98 may control the positioning of the unloader tube 18 and unloader auger operations, wherein sensors located on or proximal to the unloader tube 18 may provide feedback as to the position of the unloader tube 18. In some embodiments, the positioning may be performed entirely manually by an operator via the user interface 72, those operator-inputted instructions translated and provided to a controlled device(s) that causes the unloader tube 18 to swing open and be raised or lowered to an operational position. The operational software 98 may control the gates 44, 46 of the storage bin 20, which in turn controls the release and flow of crop material from the storage bin 20 as explained above. In some embodiments, control of the gate functions may be operated remotely, including based on communication/control signals received via the communications interface 70 from the control apparatus 60 and communicated to the controlled devices of the controlled device and sensors 68 responsible for gate control or communicated to the processor 88.

The communications software 100 works in conjunction with the communications interface 70 to receive and transmit data over the wireless/cellular network 62. The communications software 100 may enable communications via one or more of WCDMA (Wideband Code Division Multiple Access), CDMA (Code Division Multiple Access), EDGE (Enhanced Data Rates for GSM Evolution), broadband (e.g., 3G, 4G, 5G), streaming services (e.g., LoRa), GPRS (General Packet Radio Service), Zigbee (e.g., based on IEEE 802.15.4), Bluetooth, Wi-Fi (Wireless Fidelity, such as based on IEEE 802.11), and/or LTE (Long Term Evolution), among variations thereof and/or other telecommunication protocols, standards, and/or specifications. In some embodiments, the communications software 100 may include browser software to enable communications over a wide area network (e.g., the Internet).

The navigational software 102 works in conjunction with the positional device 66 to provide for autonomous or semi-autonomous navigation. For instance, the navigational software 102 may include guidance software/auto-steer software and wayline functionality that records data points from a prior traversal of the field along with parameters associated with environmental conditions and machine parameters for harvesting machines 14 to be used for farming the field. The wayline software cooperates with the guidance/auto-steer software to control the controlled devices and sensors 68 related to machine navigation to enable guided traversal and/or performance of various farming operations on a field in a semi-autonomous or autonomous manner.

Execution of the software 98-102 may be implemented by the processor 88 under the management and/or control of the operating system 96. In some embodiments, the operating system 96 may be omitted and a more rudimentary manner of control implemented.

The positional device 66 may comprise a global navigation satellite system (GNSS) receiver, including GPS, GLONASS, among others, that cooperates with the navigational software 102 as described above. In some embodiments, the positional device 66 may include an inertial guidance system (e.g., accelerometer, gyroscope, and/or magnetometer) in addition to, or in lieu of, the GNSS receiver for providing navigation functionality. In some embodiments, other methods may be used to perform or facilitate navigation, including triangulation methods from cellular and/or wireless signals.

The controlled devices and sensors 68 include the various controlled devices used to activate working functionality of the harvesting machine 14, and includes valves, motors, cylinders, pumps, switches, etc., wherein the controlled devices may be implemented according to electrical/electronic, electromechanical, hydraulic, and/or pneumatic control. The sensors of the controlled devices and sensors 68 may include load sensors, position sensors, accelerometers, optical sensors, moisture sensors, speed sensors, rotary encoders, and flow sensors, among others. For instance, the load sensors (e.g., load cells, capacitive sensors, etc.) may be used to determine the current load in the storage bin 20 of the harvesting machine. Flow sensors may be used to determine a rate of fill or discharge of the crop material to or from the storage bin 20, respectively. In some embodiments, optical sensors, including infrared sensors, may be positioned at the discharge end of the unloader tube 18 to sense the discharge rate of the crop material from the unloader tube 18. Optical sensors (e.g., including spectroscopy devices) may be used to determine protein content, and moisture sensors may be used to determine the moisture content of the harvested crop material. Position sensors may be used to detect the position of the unloader tube 18. The controlled devices and sensors 68 also comprise functionality for control of the gates 44, 46. For instance, the controlled devices of the controlled devices and sensors 68 may include electrical/electromagnetic actuators, including solenoids, that cooperate with a cylinder (e.g., hydraulic cylinder) to cause the movement of the crank and shaft assembly 54, which in turn actuates the link assembly 52 to raise and/or lower the gates 44, 46 to release and/or regulate the flow of crop material from the storage bin 20. In some embodiments, control may be via actuation of a motor (e.g., through an electromagnetic motor starter, contactor, or semi-conductor control, or via software-based (e.g., PLC) control).

The communications interface 70 may comprise a wireless modem and/or cellular modem to enable communications, in conjunction with the communications software 100, with other devices. In some embodiments, a more rudimentary communications interface may be implemented, including a radio and one or more antennas to receive and transmit data with or without the use of accompanying software.

The user interface 72 may comprise a touch-screen display device, joystick, buttons, switches, knobs, levers, keyboard, touchpad, mouse, microphone, headset, among other devices that a user selects, manipulates, and/or generally conveys instructions that are processed by the controller 64 as input to trigger or actuate one or more functionality of the harvesting machine 14.

When certain embodiments of the controller 64 are implemented at least in part as software (including firmware), as depicted in FIG. 6A, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 64 are implemented at least in part as hardware, such functionality may be implemented with any or a combination of the following technologies, which are all known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The collection vehicle control system 58 comprises a controller 76 (e.g., electronic control unit), and in some embodiments, plural controllers. The controller 76 comprises one or more processors (P) 104, an input/output (IO) interface 106, and memory (M) 108 coupled to one or more busses 110. The controller 76 is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 76. The processor 104 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other known electrical configurations comprising discrete elements both individually and in various combinations to coordinate the overall operation of the controller 76.

The input/output interface 106 provides one or more interfaces to the bus 86. In other words, the I/O interface 106 may comprise any number of interfaces for the input and output of signals (e.g., analog or digital data) for conveyance over the bus 86. The input may comprise input by an operator (local or remote) through the user interface 84 and/or input from signals carrying information from one or more of the components of the collection vehicle control system 58, such as inputs from the positional device 78, the controlled devices and sensors 80, and/or the communications interface 82. The output may comprise signals from the processor 104 executing the software in memory 108.

The memory 108 may include any one or a combination of volatile memory elements (e.g., random-access memory (RAM), including DRAM, SRAM, SDRAM, etc.) and non-volatile memory elements (e.g., ROM, Flash, solid state, EPROM, EEPROM, etc.). The memory 108 may store a native operating system, one or more native applications, emulation systems, or emulated applications for any of a variety of operating systems and/or emulated hardware platforms, emulated operating systems, etc. The memory 108 comprises executable code or instructions that are executed by the processor 104 to carry out the functionality of the controller 76. In the depicted embodiment, the memory 108 comprises an operating system (OS) 112, operational software (OPS) 114, communications software (COM) 116, and navigational software (NAV) 118. In some embodiments, the memory 108 may comprise preset capacities/specifications of the collection vehicle 16 and/or a repeatedly updated tabulation of current parameters acquired from the operational software 114 and/or navigational software 118, including bin storage capacity, current load, discharge rates (e.g., from an unloader tube located on the collection vehicle 16 for unloading crop material from the storage bin 22 to a semi-truck trailer), location, speed, and/or heading. One or more of the aforementioned information may be communicated to other authorized devices and/or accessed by such devices. It should be appreciated that in some embodiments, additional or fewer software modules (e.g., combined functionality) may be employed in the memory 108 or additional memory. In some embodiments, a separate storage device may be coupled to the data bus 110 or bus 86, such as a persistent memory (e.g., optical, magnetic, and/or semiconductor memory and associated drives). In some embodiments, functionality of the controller 76 may be distributed among plural controllers.

The operational software 114 monitors and controls various functionality corresponding to storage and unloading functions of the collection vehicle 16. The operational software 114 receives input via the input/output interface 106, including user input from the user interface 84, and sensor input from the controlled devices and sensors 80, and delivers outputs via the input/output interface 106 to the controlled devices and sensors 80. For instance, the operational software 114 may control the positioning and operation of an unloader tube used by the collection vehicle 16 to unload collected batch unloads to a semi-truck trailer. Sensors of the controlled devices and sensors 80 may be used to determine the current load of the storage bin 22 and the discharge rate from the unloader tube of the collection vehicle 16.

The communications software 116 works in conjunction with the communications interface 82 to receive from, and transmit data to, the control apparatus 60. In one embodiment, the communications are low range types of communications, including Bluetooth, Wi-Fi (Wireless Fidelity, such as based on IEEE 802.11), Zigbee, near field communications (NFC), among other types of communications including optical type communications. For instance, an operator may operate the collection vehicle 16 while possessing the control apparatus 60, where parameters concerning monitored processes, navigation-related information, etc. associated with the collection vehicle 16 are shared between the controller 76 and the control apparatus 60 over low-range networks/communication channels. In some embodiments, the communications interface 82 may comprise similar functionality to that found in the harvesting machine 14.

The navigational software 118 controls navigation of the collection vehicle 16, and also monitors navigation in conjunction with the positional device 78 to record the location, speed, and/or heading of the collection vehicle 16. In some embodiments, the navigational software 118 works in conjunction with the positional device 78 to provide for autonomous or semi-autonomous navigation.

Execution of the software 114-118 may be implemented by the processor 104 under the management and/or control of the operating system 112. In some embodiments, the operating system 112 may be omitted and a more rudimentary manner of control implemented.

The positional device 78 may comprise a global navigation satellite system (GNSS) receiver, including GPS, GLONASS, among others, that cooperates with the navigational software 118. In some embodiments, the positional device 78 may include an inertial guidance system (e.g., accelerometer, gyroscope, and/or magnetometer) in addition to, or in lieu of, the GNSS receiver for providing navigation functionality. In some embodiments, other methods may be used to perform or facilitate navigation, including triangulation methods from cellular and/or wireless signals.

The controlled devices and sensors 80 include the various controlled devices used to activate working functionality of the collection vehicle 16, and includes valves, motors, cylinders, pumps, switches, etc., wherein the controlled devices may be implemented according to electrical/electronic, electromechanical, hydraulic, and/or pneumatic control. The sensors of the controlled devices and sensors 80 may include load sensors, position sensors, accelerometers, optical sensors, moisture sensors, speed sensors, rotary encoders, and flow sensors, among others. For instance, the load sensors (e.g., load cells, capacitive sensors, etc.) may be used to determine the current load in the storage bin 22 of the collection vehicle 16. Flow sensors and/or optical sensors may be used to determine a discharge rate of the collected batch unloads from the storage bin 22 to a semi-truck trailer.

The communications interface 82 may comprise a low-range communications transceiver or wireless modem to communicate data between the collection vehicle 16 and the control apparatus 60. In some embodiments, the communications interface 82 may comprise similar functionality to the communications interface 70 of the harvesting machine 14.

The user interface 84 may comprise a touch-screen display device, joystick, buttons, switches, knobs, levers, keyboard, touchpad, mouse, microphone, headset, among other devices that a user selects, manipulates, and/or generally conveys instructions that are processed by the controller 76 as input to trigger or actuate one or more functionality of the collection vehicle 16.

When certain embodiments of the controller 76 are implemented at least in part as software (including firmware), as depicted in FIG. 6A, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 76 are implemented at least in part as hardware, such functionality may be implemented with any or a combination of the following technologies, which are all known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The wireless/cellular network 62 may include the necessary infrastructure to enable wireless and/or cellular communications between the control apparatus 60 and the harvesting machine control system 56, and wireless communications between the control apparatus 60 and the collection vehicle control system 16. There are a number of different digital cellular technologies suitable for use in the wireless/cellular network 62, including: 3G, 4G, 5G, GSM, GPRS, CDMAOne; CDMA2000, Evolution-Data Optimized (EV-DO), EDGE, Universal Mobile Telecommunications System (UMTS), Digital Enhanced Cordless Telecommunications (DECT), Digital AMPS (IS-136/TDMA), and Integrated Digital Enhanced Network (DEN), among others. As to the wireless portion of wireless/cellular network 62, one or more of different technologies may be supported, including streaming (e.g., LoRa), NFC, Bluetooth, Wi-Fi, Zigbee, etc.

In some embodiments, the wireless/cellular network 62 may include additional infrastructure, including a wide area network that includes one or a plurality of networks that in whole or in part comprise the Internet. Access may be enabled through one or more networks including PSTN (Public Switched Telephone Networks), POTS, Integrated Services Digital Network (ISDN), Ethernet, Fiber, DSL/ADSL, among others.

Figure 6B:
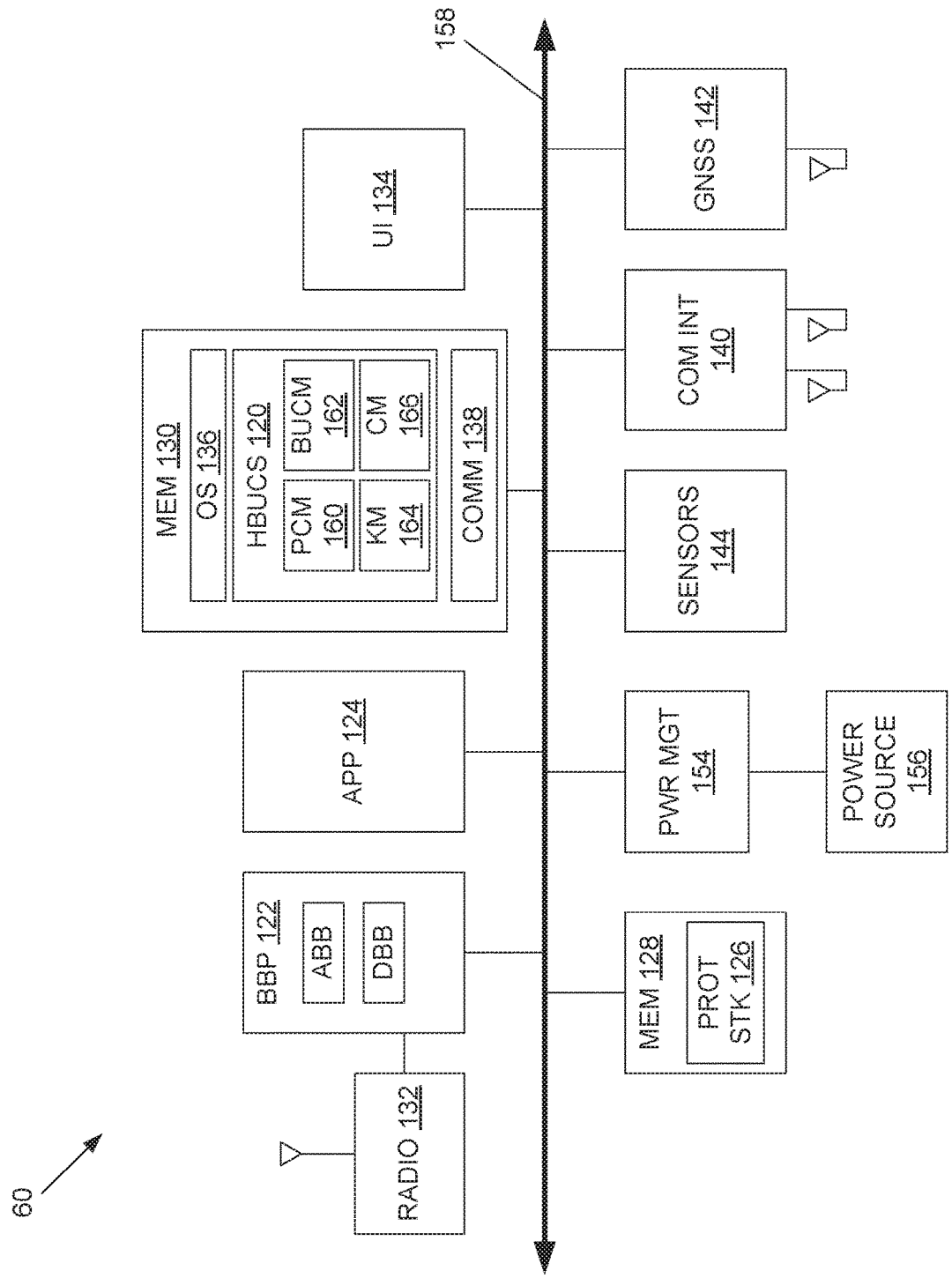
FIG. 6B is a schematic diagram that illustrates an embodiment of an example apparatus of the harvest batch unloading system of FIG. 6A.

In one embodiment, the control apparatus 60 coordinates and triggers the batch unloading of the harvesting machines 14 to the collection vehicle 16 according to communications, described in association with the timing diagram 24 of FIG. 4, with the harvesting machine control system 56 and the collection vehicle control system 58. FIG. 6B illustrates an embodiment of an example control apparatus 60 that may be used to implement at least a portion of the functionality of the harvest batch unloading system 10A of FIG. 6A. In the depicted example, the control apparatus 60 is embodied as a smartphone, though in some embodiments, other types of devices may be used, including a workstation, laptop, notebook, tablet, etc. In some embodiments, functionality of the control apparatus 60 may be integrated in the collection vehicle control system 58 or at a remote server, or in some embodiments, be implemented in association with one of the harvesting machines 14 (e.g., integrated in the harvesting machine control system 56 or reside in the harvesting machine 14, such as carried by an operator residing therein). It should be appreciated by one having ordinary skill in the art that the logical block diagram depicted in FIG. 6B and described below is one example, and that other designs may be used in some embodiments. The control apparatus 60 comprises harvest batch unloading control software (HBUCS) 120, which as described further below, performs computations needed to determine each batch unload (e.g., each amount) and from which harvesting machine 14, and in what order the batch unloads are to be collected, as well as when to make runs to a semi-truck trailer for unloading and return to the field 12. In one embodiment, the harvest batch unloading control software 120 determines batch quantities in multiple iterations, with each iteration possessing increasing complexity. For instance, in one embodiment, the harvest batch unloading control software 120 receives a request (e.g., by someone other than the harvesting machine operator) for a batch unload. For instance, the operator of the collection vehicle 16 may (e.g., manually) request the batch, or there may be a batch communicated from a remote device (e.g., a farm manager). In some embodiments, the harvest batch unloading control software 120 may generate the request on its own (e.g., based on information received from the controllers 64 and 76). The harvest batch unloading control software 120 computes batch quantities among the multiple harvesting machines 14, and then determines a suggested order of unloading based on plural parameters including heading and location of plural (e.g., all) vehicles or machines in the field, including semi-truck trailer location (or storage facility location). As noted above, the order of processing (e.g., batch quantity determination, order determination) may be performed concurrently, or in different sequences. The harvest batch unloading control software 120 then conducts communications with the harvesting machines 14 according to the determined order requesting batch unloads according to the communications described in association with the diagram 24 in FIG. 4, while repeatedly (e.g., continually) receiving updates of the plural parameters. The control apparatus 60 comprises at least two different processors, including a baseband processor (BBP) 122 and an application processor (APP) 124. As is known, the baseband processor 122 primarily handles baseband communication-related tasks and the application processor 124 generally handles inputs and outputs and all applications other than those directly related to baseband processing, though the processors 122, 124 may cooperate where the harvest batch unloading control software 120 requires data exchange or access via a cellular communication. The baseband processor 122 comprises a dedicated processor for deploying functionality associated with a protocol stack (PROT STK) 126, such as a GSM (Global System for Mobile communications) protocol stack, among other functions. The application processor 124 comprises a multi-core processor for running applications, including the harvest batch unloading control software 120. The baseband processor 122 and application processor 124 have respective associated memory (e.g., MEM) 128, 130, including random access memory (RAM), Flash memory, etc., and peripherals, and a running clock. Note that, though depicted as residing in memory 130, all or a portion of the harvest batch unloading control software 120 may be stored in memory 128, distributed among memory 128, 130, or reside in other memory.

For instance, the baseband processor 122 may deploy functionality of the protocol stack 126 to enable the control apparatus 60 to implement one or a plurality of cellular and/or wireless network technologies, including WCDMA (Wideband Code Division Multiple Access), CDMA (Code Division Multiple Access), EDGE (Enhanced Data Rates for GSM Evolution), broadband (e.g., 3G, 4G, 5G), GPRS (General Packet Radio Service), streaming services (e.g., LoRa), and/or LTE (Long Term Evolution), among variations thereof and/or other telecommunication protocols, standards, and/or specifications. The harvest batch unloading control software 120 may deploy the functionality of the protocol stack 126, such as through cooperation with the baseband processor 122 or otherwise, to access or generally, receive one or more parameters from the respective harvesting machines 14 (e.g., via the communications interface 70) of the corresponding harvesting machine control system 56 over the wireless/cellular network 62.

The baseband processor 122 manages radio communications and control functions, including signal modulation, radio frequency shifting, and encoding. The baseband processor 122 comprises, or may be coupled to, a communications interface in the form of a radio (e.g., RF front end) 132 (e.g., a cellular modem, including for instance a GSM modem), and analog and digital baseband circuitry (ABB, DBB, respectively in FIG. 6B). The radio 132 comprises one or more antennas, a transceiver, and a power amplifier to enable the receiving and transmitting of signals of a plurality of different frequencies, enabling access to the wireless/cellular network 62 (FIG. 6A), and hence accessing and/or receiving plural parameters associated with the specification, operating performance, and navigational information of the harvesting machines 14 and collection vehicle 16 via the harvesting machine control system 56 and the collection vehicle control system 58, and sending signals (e.g., requesting permission to receive batch unloads, activating flow control mechanisms, etc.) to the harvesting machines 14 (e.g., the harvesting machine control system 56). The analog baseband circuitry is coupled to the radio 132 and provides an interface between the analog and digital domains of the GSM modem (and/or cellular modem of other standards/specifications/protocols). The analog baseband circuitry comprises circuitry including an analog-to-digital converter (ADC) and digital-to-analog converter (DAC), as well as control and power management/distribution components and an audio codec to process analog and/or digital signals received indirectly via the application processor 124 or directly from a user interface (UI) 134 (e.g., microphone, speaker, earpiece, ring tone, vibrator circuits, display screen, etc.). The ADC digitizes any analog signals for processing by the digital baseband circuitry. The digital baseband circuitry deploys the functionality of one or more levels of the GSM protocol stack (e.g., Layer 1, Layer 2, etc.), and comprises a microcontroller (e.g., microcontroller unit or MCU, also referred to herein as a processor) and a digital signal processor (DSP, also referred to herein as a processor) that communicate over a shared memory interface (the memory comprising data and control information and parameters that instruct the actions to be taken on the data processed by the application processor 124). The MCU may be embodied as a RISC (reduced instruction set computer) machine that runs a real-time operating system (RTIOS), with cores having a plurality of peripherals (e.g., circuitry packaged as integrated circuits) such as RTC (real-time clock), SPI (serial peripheral interface), I2C (inter-integrated circuit), UARTs (Universal Asynchronous Receiver/Transmitter), devices based on IrDA (Infrared Data Association), SD/MMC (Secure Digital/Multimedia Cards) card controller, keypad scan controller, and USB devices, GPRS crypto module, TDMA (Time Division Multiple Access), smart card reader interface (e.g., for the one or more SIM (Subscriber Identity Module) cards), timers, and among others. For receive-side functionality, the MCU instructs the DSP to receive, for instance, in-phase/quadrature (I/Q) samples from the analog baseband circuitry and perform detection, demodulation, and decoding with reporting back to the MCU. For transmit-side functionality, the MCU presents transmittable data and auxiliary information to the DSP, which encodes the data and provides the encoded data to the analog baseband circuitry (e.g., converted to analog signals by the DAC).

The application processor 124 operates under control of an operating system (OS) 136 that enables the implementation of one or a plurality of applications, including the harvest batch unloading control software 120. The application processor 124 may be embodied as a System on a Chip (SOC), and may support web browsing functionality to access devices of the Internet. For instance, the application processor 124 may execute a communications module (COMM) 138, which may include middleware (e.g., browser with or operable in association with one or more application program interfaces (APIs)) to enable access to a cloud computing framework or other networks to provide remote data access/storage/processing, and through cooperation with an embedded operating system, access to calendars, location services, reminders, etc. The application processor 124 generally comprises a processor core (Advanced RISC Machine or ARM), and further comprises or may be coupled to multimedia modules (for decoding/encoding pictures, video, and/or audio), a graphics processing unit (GPU), a communications interface (COM INT) 140, and device interfaces. The communications module 138, executing on the application processor 124, may comprise low-range communications functionality that is used in conjunction with the communications interface 140, as instructed by the harvest batch unloading control software 120, to trigger batch unloading and/or request permission for a batch unload (e.g., via signal to the harvesting machine control system 56). In some embodiments, a cellular mechanism (e.g., via the harvest batch unloading control software 120 working in cooperation with the protocol stack 126 and radio 132) may be used for such functionality, or in some embodiments, a combination of both mechanisms (e.g., cellular and wireless functionality).

In one embodiment, the communication interface 140 and communications module 138 cooperate to provide one or more wireless services, including Zigbee (e.g., based on IEEE 802.15.4), Bluetooth, Wi-Fi (Wireless Fidelity, such as based on IEEE 802.11), etc. The application processor 124 is further coupled to (though in some embodiments, may incorporate) a global navigation satellite systems transceiver or receiver (GNSS) 142 for enabling access to a satellite network to, for instance, provide coordinate location services. In some embodiments, the GNSS receiver 142, in association with GNSS functionality in the communications module 138 or in some embodiments, as a software module in the harvest batch unloading control software 120, collects parameters pertaining to time and location data and/or heading data for the vehicle in which the control apparatus 60 resides (e.g., the collection vehicle 16), including location coordinates and altitude. In some embodiments, the harvest batch unloading control software 120 may rely on time data, location data, and/or heading data accessed from the collection vehicle control system 58 (e.g., using information obtained by the positional device 78). In some embodiments, location and/or heading data may be acquired using other techniques, including via inertial mechanisms or triangulation techniques.

In one embodiment, the smartphone comprises sensors 144, which may include one or any combination of a motion sensor(s) (e.g., an accelerometer, inertial sensors, including a gyroscope and/or magnetometer) and a camera or optical sensor (e.g., a charged coupled device (CCD) or a complementary metal-oxide semiconductor (CMOS) optical sensor).

Figure 6C:
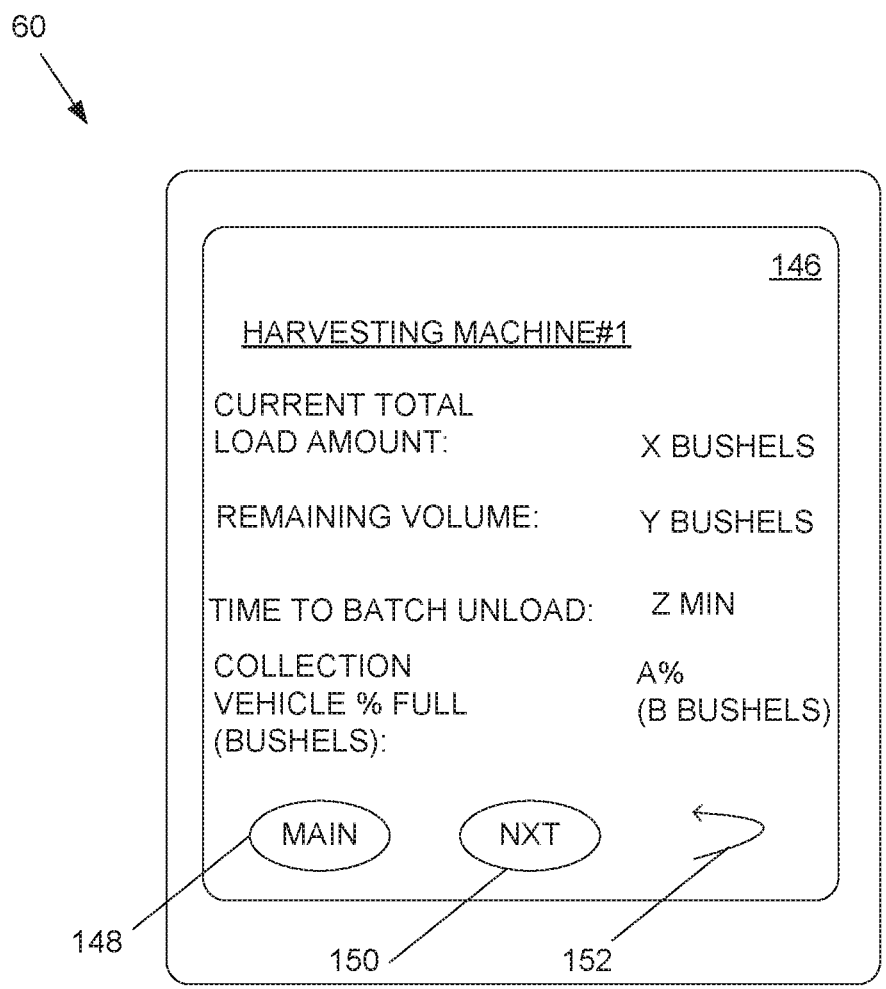
FIG. 6C is a schematic diagram that illustrates an example user interface of the apparatus depicted in FIG. 6B.

The device interfaces coupled to the application processor 124 may include the user interface 134, which may include a display screen 146 as depicted in FIG. 6C. The display screen 146 may be embodied in one of several available technologies, including LCD or Liquid Crystal Display (or variants thereof, such as Thin Film Transistor (TFT) LCD, In Plane Switching (IPS) LCD)), light-emitting diode (LED)-based technology, such as organic LED (OLED), Active-Matrix OLED (AMOLED), or retina or haptic-based technology.

The harvest batch unloading control software 120 provides feedback to an operator of the collection vehicle 16 of one or more of the processing stages implemented by the harvest batch unloading control software 120, including determinations on batch unloads and the order of collection and unloading, as well as data for each batch unload as it is about to occur from a given harvesting machine 14. For instance, as shown in the example of FIG. 6C, rendered on the display screen 146 is information received from the harvesting machine control system 56 as an operator of the collection vehicle 16, with the control apparatus 60 in hand or mounted within view, drives the collection vehicle 16 up alongside a moving harvesting machine 14 to receive a batch unload as prescribed by the harvest batch unloading control software 120. As shown in FIG. 6C, the harvest batch unloading control software 120 renders information on the display screen 146 that provides feedback of a given batch unload. For instance, the display screen 146 shows (from top-down in this example) an identifier of the current harvesting machine (harvesting machine #1), a current total load amount (e.g., X bushels) in the storage bin 20 of the harvesting machine #1, the volume (e.g., Y bushels) of crop material remaining in the storage bin 20, a time (Z minutes (min)) to unload the amount of crop material according to the prescribed batch unload, and the amount of crop material currently stored in the storage bin 22 of the collection vehicle 16 (e.g., A % full, which is B bushels). Note that the letter designations for quantities, percent, or time are generic designations for what would normally be a numeric value(s). Also, though depicted with the information pertaining to current total load amount, remaining volume, time to batch unload, and collection vehicle % full (with a corresponding value in bushels), additional, fewer, or different information may be rendered on the display screen 146 in the same screen view or accessed from other views in some embodiments. For instance, the time to batch unload may be replaced with, or supplemented by, a time remaining in the current batch unload, or in some embodiments, other measures may be used to convey to the operator the status of a batch unload or other information (e.g., speed of the vehicles, direction, etc.).

The information presented is based on the plural parameters received by the control apparatus 60 from the harvesting machine control system 56 of the harvesting machine #1, and is repeatedly updated (as are the plural parameters from other harvesting machines 14 in the field 12). Current information about current loads, distance or time to the other machines, among other information, may be accessed from other screen views using the main screen button 148. A next (NXT) button icon 150 may be used to observe a next event that the harvest batch unloading control software 120 determined in the sequence of batch unloads (e.g., details for the next harvesting machine 14 and load parameters, or a screen to request permission for a batch unload for the next harvesting machine, or a screen that instructs the operator to unload the storage bin 22 of the collection vehicle 16). The prior step button icon 152 enables the operator to go to the prior screen to see updated information about a prior event (e.g., a prior harvesting machine batch unload, etc.). Note that the various symbols and/or arrangement of the visual design of the rendering of information in the display screen 146 is merely illustrative of one example, and that in some embodiments, a different design arrangement and/or format may be presented.

The user interface 134 is described in the context of a display screen 146, though it should be appreciated by one having ordinary skill in the art, in the context of the present disclosure, that the user interface 134 may comprise other and/or additional mechanisms for providing feedback of the underlying operations, including using audible feedback (e.g., using a headset or speaker) and/or tactile feedback (e.g., using a vibratory motor that alerts the operator when, for instance, a batch unload is about complete), or different visuals (e.g., different colored lights or symbols presented on the display screen that alert the operator to different stages of a batch unload). The renderings or other form of information presented to the operator is not limited to a passively receiving the information corresponding to an underlying process controlled by the harvest batch unloading control software 120. In some embodiments, the rendered information may request acknowledgement by the operator in the form of input to the user interface 134. For instance, after the batch unload of harvesting machine #1 in the example of FIG. 6C, the harvest batch unloading control software 120 may communicate a permission request for the next batch unload to another harvesting machine 14. However, before doing so, the harvest batch unloading control software 120 may render a prompt on the display screen 146 of the impending request (e.g., the permission request for harvesting machine #2 is about to begin in X seconds, with the countdown shown in real time), enabling an operator of the collection vehicle 16 to pause the request in case of a change in circumstances (e.g., collection vehicle trouble, bathroom break, etc.). In some embodiments, the prompt may require an action on the part of the collection vehicle operator, or may be presented with a button icon to enable intervention in the underlying process. In other words, one or more actions performed by the harvest batch unloading control software 120 may be preceded with some form of communication to the operator (e.g., prompt) that provides the operator with a chance to intervene in the action or at least be notified of certain stages in the process.

Referring again to FIG. 6B, also included in the control apparatus 60 is a power management device 154 that controls and manages operations of a power source (e.g., battery) 156. The components described above and/or depicted in FIG. 6B share data over one or more busses, and in the depicted example, via data bus 158. It should be appreciated by one having ordinary skill in the art, in the context of the present disclosure, that variations to the above example description of the control apparatus 60 may be deployed in some embodiments to achieve similar functionality.

In the depicted embodiment, the application processor 124 runs the harvest batch unloading control software 120, which in one embodiment, includes a plurality of software modules (e.g., executable code/instructions) to carry out all or a portion of the functionality of the harvest batch unloading system 10A. In one embodiment, the harvest batch unloading control software 120 comprises a parameters collection module (PCM) 160, a batch unload computation module (BUCM) 162, a kinematics module (KM) 164, and communications module (CM) 166. Note that functionality of these modules 160-166 may be combined into fewer modules or extended among additional modules, or distributed among plural devices in some embodiments. The harvest batch unloading control software 120 determines storage capacities, current loads, and material ingress and egress rates among plural harvesting machines 14 and one or more collection vehicles 16, and based on such information and navigation information relative to the control apparatus 60, determines a prescribed a batch unload for each of the harvesting machines 14, a machine order of batch unloading, and when to unload from the collection vehicle 16. In the description that follows, actions performed by the various software modules 160-166 are understood to be implemented by the processor(s) 124 (and 124) implementing the functionality of the software modules 160-166 in conjunction with various components in the control apparatus 60 (e.g., the radio 132, communications interface 140, GNSS receiver 142, UI 134, etc.). The parameters collection module 160 receives plural parameters from the harvesting machines 14 and the collection vehicle 16. For instance, the harvesting machines 14 and collection vehicle 16 may store various parameters corresponding to machine storage and/or operations in memory 92 and 108, respectively. The controllers 64 and 76 and respective communications interfaces 70, 82 of the harvesting machine 14 and collection vehicle 16, respectively, may repeatedly (e.g., continually, periodically, aperiodically) communicate such parameters to the parameters collection module 160 for storage in memory 130. In some embodiments, the parameters collection module 160 may retrieve the parameters, similar to a select command in a relational database retrieval (e.g., SQL) mechanism. The plural parameters include operational parameters including any one or a combination of a current total load amount residing in the harvesting machine 14 and collection vehicle 16, load capacity remaining in the harvesting machine 14 and collection vehicle 16, a time component (e.g., in the form of time remaining (e.g., three (3) minutes from now, or absolute time (e.g., at 3:47 PM)) corresponding to a time for the load to reach the load capacity of the harvesting machine 14, navigational information, including speed (e.g., current, average), heading, geospatial location, etc. of the harvesting machine 14 and collection vehicle 16, a length of a field run for each of the harvesting machines 14, protein content of the (crop) material stored in the storage bin 20 of the harvesting machine 14, or water content of the (crop) material stored in the storage bin 20 of the harvesting machine 14.

The batch unload computation module 162 determines an amount of crop material to unload from each of the harvesting machines 14 (e.g., the batch unload) based on the received plural parameters. In one embodiment, an overall goal or strategy of the harvest batch unloading control software 120 is to maximize harvesting efficiency. In other words, the harvest batch unloading control software 120 attempts to keep as many harvesting machine 14 harvesting crop and preventing an idle state by customizing the batch unloads from each of the harvesting machines 14 in a manner that enables the collection vehicle 16 to reach each of the harvesting machines 14 for the batch unload and collect the crop material while allowing for unload operations by the collection vehicle 16 to a semi-truck trailer (or other material storage) and the return for more collections while keeping harvesting operations in play. Accordingly, the batch unload computation module 162 uses the plural parameters collected by the parameters collection module 160 and cooperates with the kinematics module 164 to make a determination on batch unloads (e.g., using bulk flow dynamic computations) and the order by which the batch unloads are to be collected. The kinematics module 164 uses the plural parameters to determine the dynamics of movement of the harvesting machines 14 relative to the collection vehicle 16, including relative distances between the collection vehicle 16 and the harvesting machines 14, a length of time for the collection vehicle 16 to reach each of the harvesting machines 14 and a corresponding selection of shortest paths in reaching the all of the harvesting machines 14 based on iterating machine visit or encounter sequences, a time component (e.g., relative or absolute time) corresponding to a length of time required by the collection vehicle 16 to unload and return for additional batch unloads. In cooperation with the computations performed by the kinematics module 164, the batch unload computation module 162 determines each batch unload amount and order of collection to enable the maximum amount of harvesting machines 14 to remain in motion during the batch unload process (e.g., while collecting a batch unload from each of the machines, keeping as many of the harvesting machines 14 in motion). In some embodiments, the batch unload amounts are performed before kinematic determinations pertaining to field navigation (e.g., heading, time until reaching a location, location, etc.). Though a goal or strategy is to maximize the harvesting operations going on at any one time, it should be appreciated that there may be instances where one or more harvesting machines 14 may remain idle (e.g., until the collection vehicle 16 can unload and return to the field 12). In any event, and consistent with the aforementioned strategy, another strategy is to reduce the amount and/or duration of idle time.

The determinations by the batch unload computation module 162 may be communicated to the operator of the collections vehicle 16 by the communications module 166. In one embodiment, the communications module 166 may inform the operator of the collection vehicle of the determinations. For instance, user interface functionality of the communications module 166 may render a summary in the form of a table on the display screen 146 showing the batch unloads per harvesting machine 14 and the order of collection of these batch unloads. In some embodiments, the communications module 166 may further render (in the same view or different screen views) additional information on the display screen 146, including determinations of distance between the harvesting machines 14 and collection vehicle 16, estimated time to reach the harvesting machine 14 from which to collect the first batch unload, the current loads of each of the harvesting machines 14 and the collection vehicle 16, among other parameters or determinations from these parameters.

The communications module 166 may also instruct the operator of the collection vehicle 16 to advance towards the first harvesting machine 14 (i.e., the first harvesting machine of the order of harvesting machines 14 determined by the batch unload computation module 162 for sequential batch collection, hereinafter referred to as the first targeted harvesting machine 14). The instruction may be achieved visually (e.g., a prompt on the display screen 146) and/or audibly (e.g., a verbal instruction via a speaker or headset). At a time corresponding to the instruction (e.g., at the same time or shortly thereafter, such as to enable the operator of the collection vehicle 16 an opportunity to refuse the instruction), the communications module 166 may instruct the communications module 138 to communicate (e.g., via the communications interface 140 or radio 132) a permission request for a batch unload to the first harvesting machine 14. The permission request may include a message to be presented at the user interface 72 of the first targeted harvesting machine 14 that advises the operator of the first targeted harvesting machine 14 of the intended batch unload from the first targeted harvesting machine 14 and also instructs the operator of the first targeted harvesting machine 14 to place the unloader tube 18 into an operational position. In some embodiments, the message may include a button icon that the operator of the harvesting machine 14 selects to indicate if the unloader tube 18 is open. The message to the operator of the first targeted harvesting machine 14 may be presented visually and/or audibly. In some embodiments, the message to the operator of the first targeted harvesting machine 14 may include an acknowledgement button icon and/or a button icon that enables the operator to refuse permission, which if (either are) selected, is received by the communications module 138 and rendered on the display screen 146 (or in the case of audible feedback, communicated audibly via a speaker or headset) to inform the operator of the collection vehicle 16 of the acknowledgement or permission refusal. Assuming permission is granted (or otherwise, the operator of the first targeted harvesting machine 14 causes the unloader tube 18 to swing open and be placed in an operational position) the collection vehicle 16 is positioned alongside of the first targeted harvesting machine 14. In one embodiment, the communications module 166 may receive a communication from the first targeted harvesting machine 14 that the unloader tube 18 is in position. The communication may be triggered by the operator of the first targeted harvesting machine 14 (e.g., the operator selects a button icon on the screen or uses another mechanism of the user interface 72), which signals to the communications module 166 that the unloader tube 18 is in an operational position and ready for the prescribed batch unload. In some embodiments, a sensor located on or proximal to the unloader tube 18 may signal (or trigger the controller 64 to cause a communication) to the communications module 166 that the unloader tube 18 is in an operational position to receive the batch unload. In some embodiments, a sensor (e.g., an optical or acoustic sensor) on the collection vehicle 16 may detect the operational position of the unloader tube 18 and signal to the communications module 166 the status of the unloader tube 18.

Responsive to the communications module 166 receiving an indication that the unloader tube 18 is in an operational position, the communications module 166 causes a control signal to be communicated to the first targeted harvesting machine 14. The communication may be achieved via the communication interface 140 or the radio 132. In one embodiment, the control signal may be communicated directly to the controlled device (e.g., motor, solenoid, etc.) of the controlled devices and sensors 68 that controls the gates 44, 46 residing in the storage bin 20 of the first targeted harvesting machine 14. For instance, control of the gates 44, 46 may be achieved via an interlocking control scheme that prevents the issuance of instructions from the controller 64 when there is an issuance of instructions remotely (e.g., from the control apparatus 60). In some embodiments, the signal from the communications module 166 may be delivered to the controller 64 of the first targeted harvesting machine 14, which instructs the controller 64 to activate the gates 44, 46. The gates 44, 46 are controlled to release the batch unload from the storage bin 20 of the first targeted harvesting machine 14 according to the batch unload determinations (e.g., the amount) of the batch unload computation module 162.

Upon the batch unload meeting the prescribed amount, the gates 44, 46 are instructed to close. In some embodiments, the gates 44, 46 may close after transpiration of a timer count monitored by the apparatus 60, or controller 64 of the harvesting machine 14. In one embodiment, the determination of when to close the gates 44, 46 contemplates the discharge rate from the unloader tube 18, any delays, and the capacity of the unloader tube 18. Note that one benefit to the intelligence on unloader tube capacity is the reduction in strain applied to the material (grain) handling system. For instance, in certain crops, the unloading auger of unloader tubes typically does not completely empty out. When the unloader tube swings open, it carries this added weight over many cycles, which results in long term wear. With certain embodiments of the harvest batch unloading system, the system is informed of the remaining capacity of the collection vehicle 16, and hence the unloader tube 18 can empty out through the closed look control of the activated gates 44, 46. The gates 44, 46, close according to the discharge rate and capacities known to the system, preventing the grain flow to the unloading auger, thus resulting in an empty auger. The harvest batch unloading control software 120 then, depending on the determined order, instructs the operator of the collection vehicle 16 to advance to the next harvesting machine 14 in the batch unloading order, with the communications module 166 communicating with the next harvesting machine 14 according to the procedure described above. In the meantime, the plural parameters are repeatedly received to update the status of the batch unloading procedure implemented by the harvest batch unloading control software 120.

Figure 7:
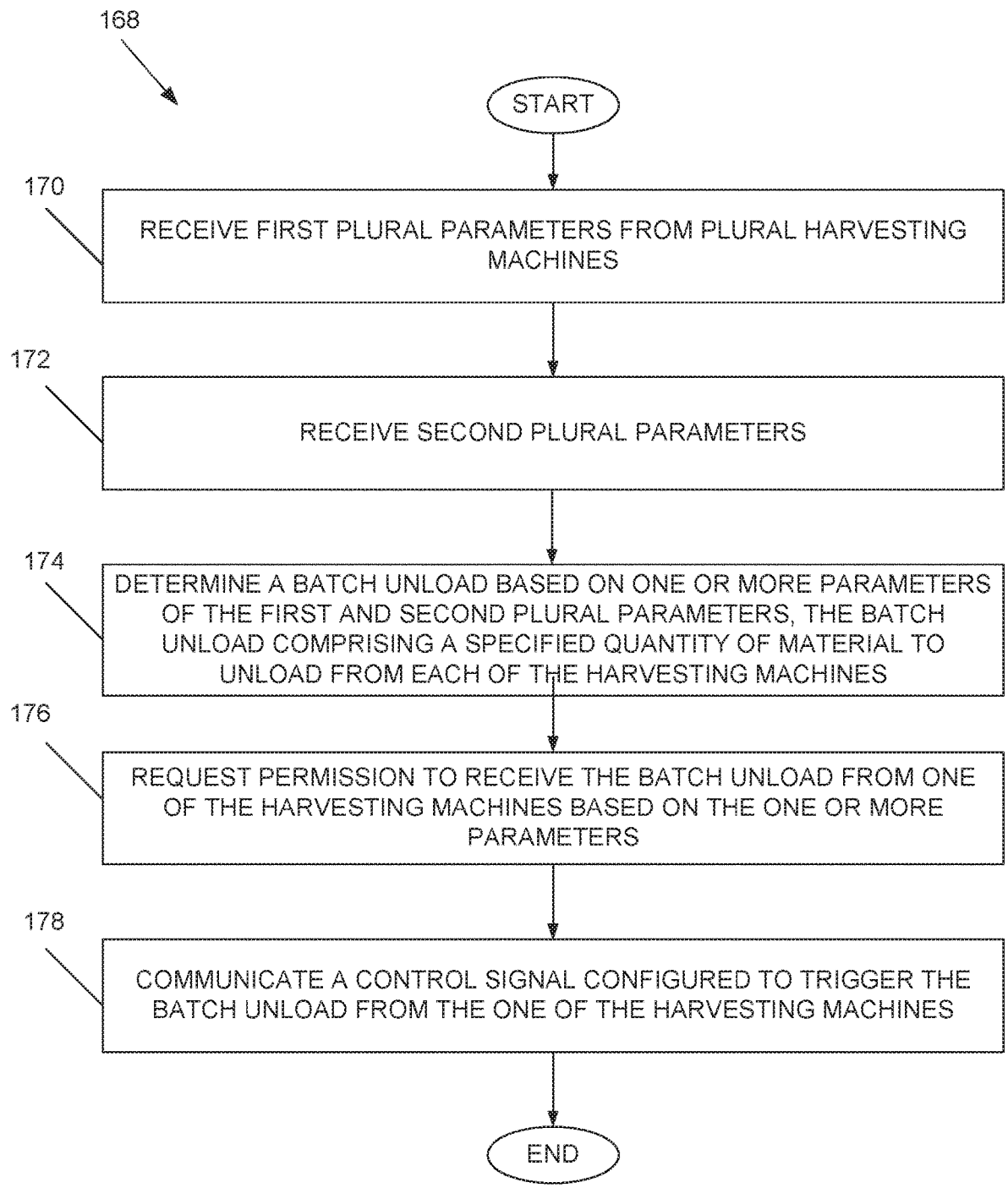
FIG. 7 is a flow diagram that illustrates an embodiment of an example harvest batch unloading method.

Having described certain embodiments of a harvest batch unloading system and method, it should be appreciated within the context of the present disclosure that one embodiment of a harvest batch unloading method, denoted as method 168 implemented by one or more processors executing the harvest batch unloading control software 120 (e.g., of the control apparatus 60) as illustrated in FIG. 7, comprises receiving first plural parameters from plural harvesting machines (170); receiving second plural parameters (172); determining a batch unload based on one or more parameters of the first and second plural parameters, the batch unload comprising a specified quantity of material to unload from each of the harvesting machines (174); requesting permission to receive the batch unload from one of the harvesting machines based on the one or more parameters (176); and communicating a control signal configured to trigger the batch unload from the one of the harvesting machines (178). In one embodiment, the first plural parameters are parameters received from the harvesting machines 14, and the second plural parameters are parameters received from the collection vehicle 16.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

In one embodiment, a claim to an apparatus is disclosed, comprising: a communications interface; a memory comprising instructions; and one or more processors configured to execute the instructions to: receive, via the communications interface, first plural parameters from plural harvesting machines; receive second plural parameters; determine a batch unload based on one or more parameters of the first and second plural parameters, the batch unload comprising a specified quantity of material to unload from each of the harvesting machines; request permission to receive the batch unload from one of the harvesting machines based on the one or more parameters; and communicate a control signal configured to trigger the batch unload from the one of the harvesting machines.

In one embodiment, the apparatus of the prior claim, wherein the first and second plural parameters include any one or a combination of a current total load amount residing in each of the harvesting machines, load capacity remaining in each of the harvesting machines, a time component corresponding to a time for the respective load to reach the respective load capacity of each of the harvesting machines, a heading of a collection vehicle and each of the harvesting machines, a current load in the collection vehicle, a length of a field run for each of the harvesting machines, protein content of the material, or water content of the material, wherein the one or more processors are further configured by the instructions to receive updates to the first and second plural parameters on a repeated basis.

In one embodiment, the apparatus of any one of the prior claims, wherein prior to the permission request, the one or more processors are further configured by the instructions to determine an order from among all of the harvesting machines from which the collection vehicle is to receive batch unloads and in what quantity based on the first and second plural parameters.

In one embodiment, the apparatus of any one of the prior claims, wherein the one or more processors are further configured by the instructions to determine the order and the batch quantities by repeatedly determining a distance of the collection vehicle relative to each of the harvesting machines, an extent to which a maximum amount of the harvesting machines and the collection vehicle can remain in motion during a batch unload from one of the harvesting machines, a time component corresponding to a length of time required by the collection vehicle to unload and return for additional batch unloads, and a length of time for the collection vehicle to reach each of the harvesting machines.

In one embodiment, the apparatus of any one of the prior claims, further comprising a user interface, wherein the user interface is configured by the instructions to: present the first plural parameters, wherein the first plural parameters include a current total load amount residing in each of the harvesting machines, a load capacity remaining in each of the harvesting machines, and a time component corresponding to a time for the load to reach the load capacity of each of the harvesting machines; and present the second plural parameters, the second plural parameters comprising at least a current load in a collection vehicle.

In one embodiment, the apparatus of any one of the prior claims, wherein the one or more processors are further configured by the instructions to request permission by including a request for an operator of the one of the harvesting machines to position an unloader tube into an operational position.

In one embodiment, the apparatus of any one of the prior claims, wherein the one or more processors are further configured by the instructions to communicate, via the communications interface, the control signal based at least in part on an indication corresponding to the unloader tube being in the operational position.

In one embodiment, the apparatus of any one of the prior claims, further including a user interface, wherein the one or more processors are further configured by the instructions to communicate, via the communications interface, the control signal based in part on the one or more processors receiving an input at the user interface or receiving a sensor input corresponding to a position of a collection vehicle relative to the one of the harvesting machines.

In one embodiment, the apparatus of any one of the prior claims, wherein the one or more processors are further configured by the instructions to communicate a signal to the one of the harvesting machines, the signal comprising information that alerts an operator of the one of the harvesting machines of an impending or currently occurring batch unload.

In one embodiment, a system comprising the apparatus of any one of the prior claims, the system comprising: plural harvesting machines, each equipped with an unloader tube and a storage bin, each of the plural harvesting machines comprising: a first communications interface; a controller; and one or more adjustable gates placed in the storage bin; a collection vehicle; and an apparatus, comprising: a second communications interface; a memory comprising instructions; and one or more processors configured to execute the instructions to: receive first plural parameters from the plural harvesting machines; receive second plural parameters from the collection vehicle; determine an order from among the plural harvesting machines from which the collection vehicle is to collect harvested material according to a respective batch unload and a quantity of each of the batch unloads based on the first and second plural parameters; request permission to receive one of the batch unloads from one of the plural harvesting machines according to the determined order and batch quantity; and communicate a control signal configured to trigger the one or more gates to release the one of the batch unloads.

In one embodiment, a method performed by the apparatus of any one of the prior claims, the method comprising: at one or more processors: receiving first plural parameters from plural harvesting machines; receiving second plural parameters; determining a batch unload based on one or more parameters of the first and second plural parameters, the batch unload comprising a specified quantity of material to unload from each of the harvesting machines; requesting permission to receive the batch unload from one of the harvesting machines based on the one or more parameters; and communicating a control signal configured to trigger the batch unload from the one of the harvesting machines.

In one embodiment, a claim to a system is disclosed, comprising: plural harvesting machines, each equipped with an unloader tube and a storage bin, each of the plural harvesting machines comprising: a first communications interface; a controller; and one or more adjustable gates placed in the storage bin; a collection vehicle; and an apparatus, comprising: a second communications interface; a memory comprising instructions; and one or more processors configured to execute the instructions to: receive first plural parameters from the plural harvesting machines; receive second plural parameters from the collection vehicle; determine an order from among the plural harvesting machines from which the collection vehicle is to collect harvested material according to a respective batch unload and a quantity of each of the batch unloads based on the first and second plural parameters; request permission to receive one of the batch unloads from one of the plural harvesting machines according to the determined order and batch quantity; and communicate a control signal configured to trigger the one or more gates to release the one of the batch unloads.

In one embodiment, the system of the prior system claim, wherein the first and second plural parameters include any one or a combination of a current total load amount residing in each of the harvesting machines, load capacity remaining in each of the harvesting machines, a time component corresponding to a time for the load in each of the harvesting machines to reach the load capacity of the respective harvesting machine, a heading of the collection vehicle and each of the harvesting machines, a current load in the collection vehicle, a length of a field run for each of the harvesting machines, protein content of the harvested material, or water content of the harvested material, wherein the one or more processors are further configured by the instructions to receive updates to the first and second plural parameters on a repeated basis.

In one embodiment, the system of any one of the prior system claims, wherein the one or more processors are further configured by the instructions to repeatedly determine the order and the batch quantities by repeatedly determining a distance of the collection vehicle to each of the harvesting machines, an extent to which a maximum amount of the harvesting machines and the collection vehicle can remain in motion during a batch unload from one of the harvesting machines, a time component corresponding to a length of time required by the collection vehicle to unload and return for additional batch unloads, and a length of time for the collection vehicle to reach each of the harvesting machines.

In one embodiment, the system of any one of the prior system claims, wherein the apparatus further comprises a user interface, wherein the user interface is configured by the instructions to present the first plural parameters, wherein the first plural parameters include a current total load amount residing in each of the harvesting machines, a load capacity remaining in each of the harvesting machines, and a time component corresponding to a time for each of the loads from each of the harvesting machines to reach the respective load capacity of the respective harvesting machine.

In one embodiment, the system of any one of the prior system claims, wherein the user interface is further configured by the instructions to present the second plural parameters, the second plural parameters comprising at least a current load in the collection vehicle.

In one embodiment, the system of any one of the prior system claims, wherein the one or more processors are further configured by the instructions to request permission by including a request for an operator of the one of the harvesting machines to position the unloader tube into an operational position.

In one embodiment, the system of any one of the prior system claims, wherein the one or more processors are further configured by the instructions to communicate, via the second communications interface, the control signal based at least in part on an indication corresponding to the unloader tube being in the operational position.

In one embodiment, the system of any one of the prior system claims, wherein the apparatus further includes a user interface, wherein the one or more processors are further configured by the instructions to communicate, via the second communications interface, the control signal based in part on the one or more processors receiving an input at the user interface.

In one embodiment, the system of any one of the prior system claims, wherein the one or more processors are further configured by the instructions to communicate, via the second communications interface, the control signal based in part on the one or more processors receiving a sensor input corresponding to a position of the collection vehicle relative to the one of the harvesting machines.

In one embodiment, the system of any one of the prior system claims, wherein the one of the harvesting machines further comprises a user interface, wherein the one or more processors are further configured by the instructions to communicate a signal via the second communications interface to the one of the harvesting machines, the signal comprising information presented at the user interface of the one of the harvesting machines that alerts an operator that the one of the batch unloads is impending or currently occurring.

In one embodiment, a claim to a method is disclosed, comprising: at one or more processors: receiving first plural parameters from plural harvesting machines; receiving second plural parameters; determining a batch unload based on one or more parameters of the first and second plural parameters, the batch unload comprising a specified quantity of material to unload from each of the harvesting machines; requesting permission to receive the batch unload from one of the harvesting machines based on the one or more parameters; and communicating a control signal configured to trigger the batch unload from the one of the harvesting machines.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. For instance, the description above emphasizes the control apparatus 60 as being in control of the operator of the collection vehicle 16. However, in some embodiments, the control apparatus 60 may be in possession of other entities during farming operations, including one of the harvesting machine operators, a semi-truck trailer operator, or a farm manager located remote from the field 12. In the case of the control apparatus 60 in the possession of one of the operators of the harvesting machines 14 (e.g., a host harvesting machine 14), parameters from the collection vehicle 16 may be obtained from a control system residing in the collection vehicle that has similar functionality to that described for the harvesting machines 14, and parameters from the host harvesting machine 14 may be communicated in a manner similar to that described for the collection vehicle 16 (e.g., using short-range communications). In some embodiments, the control apparatus 60 stores (or accesses via, for instance, an Internet connection to a farm server) a harvesting recipe map for the field 12, wherein the batch unloading computations performed by the harvest batch unloading control software 120 may consider the batch unloads according to predefined staging areas of the harvesting recipe map. In some embodiments, the staging areas are selectively chosen by the harvest batch unloading control software 120, such as (in addition to the considerations based on the plural parameters) based on topography, lack of obstacles, etc. Certain embodiments of a harvest batch unloading system may negate or eliminate the need for yield calibrations. For instance, the availability of grain cars in all regions of the world is not guaranteed. With data for material (grain) volume and weight readily available, as described above, intelligent harvesting operations are achievable that do not require additional equipment for calibrating its own features. In some embodiments, the harvest batch unloading system enables the capability to blend crops within a field. For instance, in some circumstances, the crop moisture or crop quality may vary throughout the field. The variance may result in a price dock at an elevator facility. Certain embodiments of the harvest batch unloading system enable an operator to blend loads of varying moisture or quality to meet the elevator facility requirements. In some embodiments, recommendations may be made by certain embodiments of the harvest batch unloading system for harvesting in a way that maximizes potential profits. In other words, the harvest batch unloading control software 120 may schedule batch unloads that provides for a mix of dry and moist crop material that, as a net aggregation, results in a more profitable harvest at the elevator facility. A similar approach may be used for protein content (e.g., using optical technique, including spectroscopy, to make protein quality determinations). All such modifications and variations are intended to be included herein within the scope of this disclosure and protected by the following claims. Two or more embodiments disclosed herein may be combined according to any combination. Any reference signs in the claims should be not construed as limiting the scope.

The invention claimed is:

1. An apparatus, comprising:
a communications interface;
a memory comprising instructions; and
one or more processors configured to execute the instructions to:
receive, via the communications interface, first plural parameters from plural harvesting machines;
receive second plural parameters;
determine a batch unload based on one or more parameters of the first and second plural parameters, the batch unload comprising a specified quantity of material to unload from each of the harvesting machines;
request permission to receive the batch unload from one of the harvesting machines based on the one or more parameters; and
communicate a control signal configured to trigger the batch unload from the one of the harvesting machines;
wherein the first and second plural parameters include any one or a combination of a current total load amount residing in each of the harvesting machines, load capacity remaining in each of the harvesting machines, a time component corresponding to a time for the respective load to reach the respective load capacity of each of the harvesting machines, a heading of a collection vehicle and each of the harvesting machines, a current load in the collection vehicle, a length of a field run for each of the harvesting machines, protein content of the material, or water content of the material, wherein the one or more processors are further configured by the instructions to receive updates to the first and second plural parameters on a repeated basis,
wherein prior to the permission request, the one or more processors are further configured by the instructions to determine an order from among all of the harvesting machines from which the collection vehicle is to receive batch unloads and in what quantity based on the first and second plural parameters,
wherein the one or more processors are further configured by the instructions to determine the order and the batch quantities by repeatedly determining a distance of the collection vehicle relative to each of the harvesting machines, an extent to which a maximum amount of the harvesting machines and the collection vehicle can remain in motion during a batch unload from one of the harvesting machines, a time component corresponding to a length of time required by the collection vehicle to unload and return for additional batch unloads, and a length of time for the collection vehicle to reach each of the harvesting machines.

2. The apparatus of claim 1, further comprising a user interface, wherein the user interface is configured by the instructions to:
present the first plural parameters, wherein the first plural parameters include a current total load amount residing in each of the harvesting machines, a load capacity remaining in each of the harvesting machines, and a time component corresponding to a time for the load to reach the load capacity of each of the harvesting machines; and
present the second plural parameters, the second plural parameters comprising at least a current load in a collection vehicle.

3. The apparatus of claim 1, wherein the one or more processors are further configured by the instructions to request permission by including a request for an operator of the one of the harvesting machines to position an unloader tube into an operational position.

4. The apparatus of claim 3, wherein the one or more processors are further configured by the instructions to communicate, via the communications interface, the control signal based at least in part on an indication corresponding to the unloader tube being in the operational position.

5. The apparatus of claim 3, further including a user interface, wherein the one or more processors are further configured by the instructions to communicate, via the communications interface, the control signal based in part on the one or more processors receiving an input at the user interface or receiving a sensor input corresponding to a position of a collection vehicle relative to the one of the harvesting machines.

6. The apparatus of claim 3, wherein the one or more processors are further configured by the instructions to communicate a signal to the one of the harvesting machines, the signal comprising information that alerts an operator of the one of the harvesting machines of an impending or currently occurring batch unload.

7. A system, comprising:
plural harvesting machines, each equipped with an unloader tube and a storage bin, each of the plural harvesting machines comprising:
a first communications interface;
a controller;
one or more adjustable gates placed in the storage bin;
a collection vehicle; and
an apparatus, comprising:
a second communications interface;
a memory comprising instructions; and
one or more processors configured to execute the instructions to:
receive first plural parameters from the plural harvesting machines;
receive second plural parameters from the collection vehicle;
determine an order from among the plural harvesting machines from which the collection vehicle is to collect harvested material according to a respective batch unload and a quantity of each of the batch unloads based on the first and second plural parameters;
request permission to receive one of the batch unloads from one of the plural harvesting machines according to the determined order and batch quantity; and
communicate a control signal configured to trigger the one or more gates to release the one of the batch unloads, wherein the first and second plural parameters include any one or a combination of a current total load amount residing in each of the harvesting machines, load capacity remaining in each of the harvesting machines, a time component corresponding to a time for the load in each of the harvesting machines to reach the load capacity of the respective harvesting machine, a heading of the collection vehicle and each of the harvesting machines, a current load in the collection vehicle, a length of a field run for each of the harvesting machines, protein content of the harvested material, or water content of the harvested material, wherein the one or more processors are further configured by the instructions to receive updates to the first and second plural parameters on a repeated basis, wherein the one or more processors are further configured by the instructions to repeatedly determine the order and the batch quantities by repeatedly determining a distance of the collection vehicle to each of the harvesting machines, an extent to which a maximum amount of the harvesting machines and the collection vehicle can remain in motion during a batch unload from one of the harvesting machines, a time component corresponding to a length of time required by the collection vehicle to unload and return for additional batch unloads, and a length of time for the collection vehicle to reach each of the harvesting machines.

8. The system of claim 7, wherein the apparatus further comprises a user interface, wherein the user interface is configured by the instructions to present the first plural parameters, wherein the first plural parameters include a current total load amount residing in each of the harvesting machines, a load capacity remaining in each of the harvesting machines, and a time component corresponding to a time for each of the loads from each of the harvesting machines to reach the respective load capacity of the respective harvesting machine.

9. The system of claim 8, wherein the user interface is further configured by the instructions to present the second plural parameters, the second plural parameters comprising at least a current load in the collection vehicle.

10. The system of claim 7, wherein the one or more processors are further configured by the instructions to request permission by including a request for an operator of the one of the harvesting machines to position the unloader tube into an operational position.

11. The system of claim 10, wherein the one or more processors are further configured by the instructions to communicate, via the second communications interface, the control signal based at least in part on an indication corresponding to the unloader tube being in the operational position.

12. The system of claim 10, wherein the apparatus further includes a user interface, wherein the one or more processors are further configured by the instructions to communicate, via the second communications interface, the control signal based in part on the one or more processors receiving an input at the user interface.

13. The system of claim 10, wherein the one or more processors are further configured by the instructions to communicate, via the second communications interface, the control signal based in part on the one or more processors receiving a sensor input corresponding to a position of the collection vehicle relative to the one of the harvesting machines.

14. The system of claim 10, wherein the one of the harvesting machines further comprises a user interface, wherein the one or more processors are further configured by the instructions to communicate a signal via the second communications interface to the one of the harvesting machines, the signal comprising information presented at the user interface of the one of the harvesting machines that alerts an operator that the one of the batch unloads is impending or currently occurring.

* * * * *